United States Patent [19]

Luchs et al.

[11] Patent Number: 4,831,526
[45] Date of Patent: May 16, 1989

[54] COMPUTERIZED INSURANCE PREMIUM QUOTE REQUEST AND POLICY ISSUANCE SYSTEM

[75] Inventors: Charles M. Luchs, Mendham; Richard Salway, Cranford, both of N.J.; Parker Rush, Bryn Mawr, Pa.; Fern-Ann Davy, New Providence, N.J.; John Loia, Somerville, N.J.; Bernice Alexander, Bernardsville, N.J.; Carol Johnson, Morristown, N.J.; John Carducci, Long Valley, N.J.

[73] Assignee: The Chubb Corporation, Warren, N.J.

[21] Appl. No.: 854,780

[22] Filed: Apr. 22, 1986

[51] Int. Cl.⁴ .................. G06F 15/21; G06F 15/40
[52] U.S. Cl. ................................. 364/401; 364/408
[58] Field of Search ............. 364/401, 408; 235/381, 235/375

[56] References Cited

U.S. PATENT DOCUMENTS

| | | | |
|---|---|---|---|
| 3,970,992 | 7/1976 | Boothroyd et al. | 364/900 |
| 4,347,568 | 8/1982 | Giguere et al. | 364/900 X |
| 4,359,631 | 11/1982 | Lockwood et al. | 235/381 |
| 4,491,725 | 1/1985 | Pritchard | 235/375 |
| 4,553,206 | 11/1985 | Smutek et al. | 364/300 |
| 4,567,359 | 1/1986 | Lockwood | 235/381 |
| 4,598,367 | 7/1986 | DeFrancesco et al. | 364/408 |
| 4,633,430 | 12/1986 | Cooper | 364/900 |
| 4,642,768 | 2/1987 | Roberts | 364/408 |
| 4,646,250 | 2/1987 | Childress | 364/518 |
| 4,730,252 | 3/1988 | Bradshaw | 364/403 |

OTHER PUBLICATIONS

Geico Automobile Policy Statements, Sep. 14, 1982, and Oct. 4, 1982.
Geico Automobile Insurance Policy Statement, Apr. 1985.
Chubb QP System, date unknown.

Primary Examiner—Clark A. Jablon
Attorney, Agent, or Firm—Curtis, Morris & Safford

[57] ABSTRACT

A fully computerized insurance system is provided for processing and preparing applications for insurance and premium quotations and for preparing and writing insurance contracts. A central processor, including a data bank into which data is written and from which data is read, this data including information regarding the risk to be insured, client information, insurance premium information and predetermined text data for incorporation with insurance contracts, is interconnected with plural terminals, including input and display apparatus, to permit data to be entered and retrieved from the central processor. The central processor is also provided with the capability of merging entered or stored data with predetermined text data to compile data embodying a final insurance document. This data is then communicated to a printer for printing of the insurance document.

25 Claims, 30 Drawing Sheets

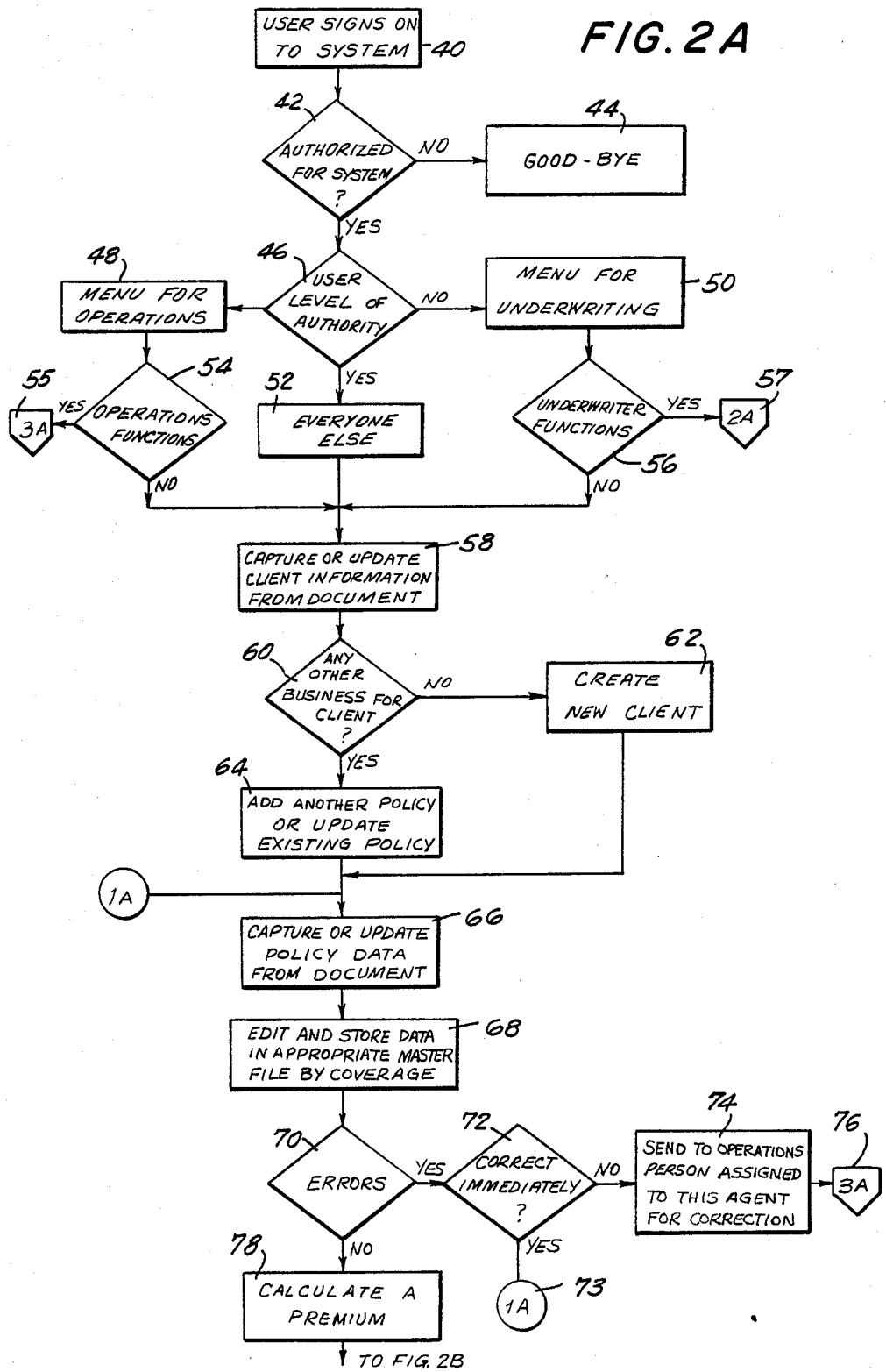

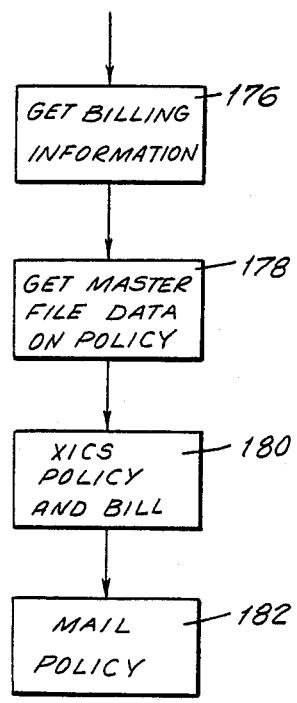

FIG. 7

```
      *----+----1----+----2----+----3----+----4----+----5----+----6----+----7----+----8
      ***************************************************************************
   *                                                                              *
01 *                                                                              * 01
   *                                                                     P100     *
02 *                            HOME MENU~337                            335      * 02
   *                                                                              *
03 * ---------------------------------------------------------------------------- * 03
   *                                                                              *
04 * A) INQUIRY                                                                   * 04
   *                                                                              *
05 * B) CREATE CLIENT                                                             * 05
   *                                                                              *
06 * C) UPDATE CLIENT INFORMATION         338                                     * 06
   *                                                                              *
07 * D) CREATE QUOTE/POLICY                                                       * 07
   *                                                                              *
08 * E) UPDATE QUOTE/POLICY                                                       * 08
   *                                                                              *
09 * F) RATE/RULE INQUIRY                                                         * 09
   *                                                                              *
10 * G) CONTRACT INQUIRY                                                          * 10
   *                                                                              *
11 *                                                                              * 11
   *                                                                              *
12 *                                                                              * 12
   *                                                                              *
13 * FOR LETTERS C AND D ENTER CLIENT NO OR NAME - STATE OPTIONAL                 * 13
   *                                                                              *
14 * FOR LETTER  E ENTER QP NO OR NAME - STATE OPTIONAL                           * 14
   *                                                          340                 *
15 *                                                                              * 15
   *                                                                              *
16 *                                                                              * 16
   *                                                                              *
17 *                                                                              * 17
   *                                                                              *
18 *                                                                              * 18
   *                                                                              *
19 *                                                                              * 19
   *                           342                                                *
20 *                                                                              * 20
   *                                                                              *
21 * ---------------------------------------------------------------------------- * 21
   *                                                                              *
22 * 7-PROCESS         10-HELPERR        11-HELPSCR          99-END               * 22
   *                                                                              *
23 * ACTION: 7_____  LETTER: A  STATE: ___                                        * 23
   *                                                                              *
24 * CLIENT NO: _____  QP NO: _____ - __  NAME(L,F,M): _____  * 24
      ***************************************************************************
      *----+----1----+----2----+----3----+----4----+----5----+----6----+----7----+----8
```

FIG. 8

```
*----+----1----+----2----+----3----+----4----+----5----+----6----+----7----+----8
*******************************************************************************
01 *                                                                           *
   *                                                                      P102 * 01
02 *                            HOME MENU                                      *
   *                                    ~337                         335       * 02
03 * ------------------------------------------------------------------------- * 03
04 * A) INQUIRY                    G) OPERATIONS IN-BOX                        * 04
   *                                                                           *
05 * B) CREATE CLIENT              H) CONTACT PRODUCER IN-BOX                  * 05
   *                                                                           *
06 * C) UPDATE CLIENT INFORMATION  I) SYSTEM ERROR IN-BOX                      * 06
   *                                                                           *
07 * D) CREATE QUOTE/POLICY        J) SERVICE OVERVIEW                         * 07
   *                                                                           *
08 * E) UPDATE QUOTE/POLICY        K) STAFF PROFILE                            * 08
   *                                                                           *
09 * F) QUOTE/POLICY TRACKING                              338                 * 09
10 *                                                                           * 10
11 *                                                                           * 11
12 *                                                                           * 12
13 * FOR LETTERS C AND D ENTER CLIENT NO OR NAME - STATE OPTIONAL              * 13
14 * FOR LETTERS E AND F ENTER QP NO OR NAME - STATE OPTIONAL   ---340         * 14
15 * FOR LETTER G ENTER DEPT OR DEPT/INITIALS                                  * 15
16 * FOR LETTER H ENTER DEPT OR PRODUCER                                       * 16
17 * FOR LETTER I ENTER DEPT                                                   * 17
18 * FOR LETTER J ENTER DEPT - PLSB FOR ALL DEPT                               * 18
19 *                                                                           * 19
20 *                                                 342                       * 20
21 * ------------------------------------------------------------------------- * 21
22 * 7-PROCESS          10-HELPERR          11-HELPSCR           99-END        * 22
23 * ACTION: 7____ LETTER: A DEPT: ____ INITIALS: ___ PROD: ___ STATE: ___     * 23
24 * CLIENT NO: _____ QP NO: _____ - __ NAME(L,F,M): _____       * 24
*******************************************************************************
*----+----1----+----2----+----3----+----4----+----5----+----6----+----7----+----8
```

FIG. 9

```
    *----+----1----+----2----+----3----+----4----+----5----+----6----+----7----+----8
    ***********************************************************************************
    *                                                                                  *
01  *                                                                        P101      * 01
    *                                                                                  *
02  *                           HOME MENU——337                          335            * 02
    *                                                                                  *
03  * -------------------------------------------------------------------------------- * 03
    *                                                                                  *
04  * A) INQUIRY                                                                       * 04
    *                                                                                  *
05  * B) CREATE CLIENT                                                                 * 05
    *                                                                                  *
06  * C) UPDATE CLIENT INFORMATION                                                     * 06
    *                                                                                  *
07  * D) CREATE QUOTE/POLICY                                                           * 07
    *                                                                                  *
08  * E) UPDATE QUOTE/POLICY                                                           * 08
    *                                                                                  *
09  * F) QUOTE/POLICY TRACKING ——————— 338                                             * 09
    *                                                                                  *
10  * G) UNDERWRITING ACTIVITY                                                         * 10
    *                                                                                  *
11  *                                                                                  * 11
    *                                                                                  *
12  * FOR LETTERS C AND D ENTER CLIENT NO OR NAME - STATE OPTIONAL                     * 12
    *                                                                                  *
13  * FOR LETTERS E AND F ENTER QP NO OR NAME - STATE OPTIONAL                         * 13
    *                                                                  340             *
14  *                                                                                  * 14
    *                                                                                  *
15  *                                                                                  * 15
    *                                                                                  *
16  *                                                                                  * 16
    *                                                                                  *
17  *                                                                                  * 17
    *                                                                                  *
18  *                                                                                  * 18
    *                                                                                  *
19  *                                                                                  * 19
    *                                                                                  *
20  *                                        342                                       * 20
    *                                                                                  *
21  * -------------------------------------------------------------------------------- * 21
    *                                                                                  *
22  * 7-PROCESS         10-HELPERR          11-HELPSCR              99-END             * 22
    *                                                                                  *
23  * ACTION: 7_____ LETTER: A  STATE: ___                                             * 23
    *                                                                                  *
24  * CLIENT NO: _____  QP NO: _____ - __  NAME(L,F,M): _____            * 24
    ***********************************************************************************
    *----+----1----+----2----+----3----+----4----+----5----+----6----+----7----+----8
```

FIG. 10A

```
*----+----1----+----2----+----3----+----4----+----5----+----6----+----7----+----8
****************************************************************************
01 *                                                                        *
   *                                                                  P105* 01
02 * CLIENT MAILING INFORMATION                                             *
   *                                                                       * 02
03 *                                                                       *
   *                                                                       * 03
04 * ---------------------------------------------------------------------- * 04
   *                                                                       *
05 * NAME USED ON POLICY: MR. JOHN SMITH_____ ~ 344           * 05
   *                                                                       *
06 *                    _____                                * 06
   *                                                                       *
07 * MAILING ADDRESS: 55 MAPLE AVE_____ ~ 346                          * 07
   *                                                                       *
08 * CITY: CAMP POINT_____ ~ 352    COUNTY: ADAMS_____ ~ 348           * 08
   *                                                                       *
09 * STATE: ILL_ ~ 354               ZIP: 66666____ ~ 350                   * 09
   *                                                                       *
10 * PHONE: ___-___-___              EXT: ___                               * 10
   *                                                                       *
11 * CLIENT NAME PREFIX: MR.___                                             * 11
   *                                                                       *
12 * FIRST: JOHN_____ ~ 356     MIDDLE: D.___                          * 12
   *                                                                       *
13 * LAST: SMITH_____ ~ 358                                     * 13
   *                                                                       *
14 * SUFFIX: ___                                                            * 14
   *                                                                       *
15 * OCCUPATION: MANAGER____ ~ 360   AGE: 35_ ~ 362                         * 15
   *                                                                       *
16 * SPOUSE NAME PREFIX: _____                                             * 16
   *                                                                       *
17 * FIRST: _____                MIDDLE: _____                    * 17
   *                                                                       *
18 * LAST: _____                                            * 18
   *                                                                       *
19 * SUFFIX: ___                                                            * 19
   *                                                                       *
20 * OCCUPATION: _____           AGE: ___                              * 20
   *                                                                       *
21 *                                                                       * 21
   *                                                                       *
22 * ---------------------------------------------------------------------- * 22
   *                                                                       *
23 * 1-HOME      7-PROCESS    10-HELPERR    11-HELPSCR      99-END          * 23
   *                                                                       *
24 * ACTION: 7_____                                                         * 24
****************************************************************************
*----+----1----+----2----+----3----+----4----+----5----+----6----+----7----+----8
```

FIG. 10B

```
     *----+----1----+----2----+----3----+----4----+----5----+----6----+----7----+----8
     *********************************************************************************
  01 *                                                                    P106*  01
     *                                                                        *
  02 * CLIENT INFORMATION                                                     *  02
     *                                                                        *
  03 * CLIENT NUMBER: 10001374                                                *  03
     *                                                                        *
  04 * CLIENT NAME: MR. JOHN SMITH                                            *  04
     *                                                                        *
  05 *----------------------------------------------------------------------- *  05
     *                                                                        *
  06 * NEW LINE/QUOTE (Y/N): Y  —364                                          *  06
     *                                                                        *
  07 * RENEWAL CONVERAION (Y/N): N  —366                                      *  07
     *                                                                        *
  08 * DATE RECEIVED (MMDDYY): 111185     DATE REQUESTED (MMDDYY): 111185     *  08
     *                               368                                  370 *
  09 *                                                                        *  09
     *                                                                        *
  10 * COVERAGE(S) REQUESTED                                                  *  10
     *                                                                        *
  11 * HOMES/CONTENTS (Y/N): Y —372       VALUABLE ARTICLES (Y/N): Y          *  11
     *                                                                        *
  12 * VEHICLES (Y/N): N                  WATERCRAFT (Y/N): N                 *  12
     *                                                                        *
  13 * EXCESS LIABILITY (Y/N): N                                              *  13
     *                                                                        *
  14 *                           374                              376         *  14
     *                                                                        *
  15 * EFFECTIVE DATE (MMDDYY): 111185    EXPIRATION DATE (MMDDYY): 111186    *  15
     *                                                                        *
  16 * WRITING COMPANY: FEDERAL_____—378                           *  16
     *                                                                        *
  17 * PRODUCER NUMBER: 30301 —380        SUB PRODUCER NUMBER: ___            *  17
     *                                                                        *
  18 * AGENCY BILL (Y/N): N —382          AGENCY PAYMENT PLAN: _____       *  18
     *                                                                        *
  19 * MAIL INITIAL BILL AND POLICY TO PRODUCER (Y/N): N ——384                *  19
     *                                                                        *
  20 * IS POLICY WRITTEN IN NAME OF INDIVIDUAL(S) (Y/N): Y—386                *  20
     *                                                                        *
  21 *----------------------------------------------------------------------- *  21
     *                                                                        *
  22 * 1-HOME      7-PROCESS      10-HELPERR      11-HELPSCR       99-END*    *  22
     *                                                                        *
  23 *                                                                        *  23
     *                                                                        *
  24 * ACTION: 7____                                                          *  24
     *********************************************************************************
     *----+----1----+----2----+----3----+----4----+----5----+----6----+----7----+----8
```

FIG. 10C

```
    *----+----1----+----2----+----3----+----4----+----5----+----6----+----7----+----8
    *********************************************************************************
 01 *                                                                      P112*  01
 02 * POLICY LIMITS                                                            *  02
                                                          ⟋388
 03 * QP NUMBER: 10001374-01            QUOTE VERSION: 1                       *  03
 04 * CLIENT NAME: MR. JOHN SMITH                                              *  04
 05 *--------------------------------------------------------------------------*  05
 06 * LIMIT OF LEGAL LIABILITY: $ 300,000____  ⌐390                            *  06
 07 *                                                                          *  07
 08 *                                                                          *  08
 09 *                                                                          *  09
 10 *                                                                          *  10
 11 *                                                                          *  11
 12 *                                                                          *  12
 13 *                                                                          *  13
 14 *                                                                          *  14
 15 *                                                                          *  15
 16 *                                                                          *  16
 17 *                                                                          *  17
 18 *                                                                          *  18
 19 *                                                                          *  19
 20 *                                                                          *  20
 21 *--------------------------------------------------------------------------*  21
 22 * 1-HOME    2-RETURN    4-SUSPEND   7-PROCESS  10-HELPERR   11-HELPSCRN  99-END* 22
 23 *                                                                          *  23
 24 * ACTION: 7_____ SELECTION: _____ NUMBER: ____ CLASS: ____ SUBCLASS: _*  24
    *********************************************************************************
    *----+----1----+----2----+----3----+----4----+----5----+----6----+----7----+----8
```

FIG. 10D

```
    *----+----1----+----2----+----3----+----4----+----5----+----6----+----7----+----8
    ***************************************************************************
    *                                                                          *
01  *                                                                  P114*  01
    *                                                                          *
02  * PROPERTY LOCATION                                                        * 02
    *                                                                          *
03  * QP NUMBER: 10001374-01            QUOTE VERSION: 1                       * 03
    *                                                                          *
04  * CLIENT NAME: MR. JOHN SMITH                                              * 04
    *                                                                          *
05  * ------------------------------------------------------------------------ * 05
    *                                                                          *
06  * PROPERTY LOCATION NUMBER:  1                                             * 06
    *                                      /—390
07  * STREET: 55 MAPLE AVE_____                                     * 07
    *                                                          /—396
08  * CITY: CAMP POINT_____~—392    COUNTY: ADAMS_____                   * 08
    *                                                                          *
09  * STATE: ILL_ ~—394                ZIP: 66666____  ~—398                   * 09
    *                                                                          *
10  * TERRITORY: __                    CITY/COUNTY CODE: ____                  * 10
    *                                                                          *
11  * RESIDENCE (HOUSE,CONDO,CO-OP,RENTAL): HOUSE_ —400                        * 11
    *                                                                          *
12  * RENTED TO OTHERS (Y/N): N — 402   FARMING (Y/N): N                       * 12
    *                                                                          *
13  * SEASONAL/SECONDARY (Y/N): N                                              * 13
    *                                                                          *
14  * FIRE STATION WITHIN 5 MILES (Y/N): Y — 404                               * 14
    *                                                                          *
15  * FIRE HYDRANT WITHIN 1000 FEET (Y/N): Y — 404                             * 15
    *                                                                          *
16  * BURGLAR ALARM (Y/N): N — 406     FIRE ALARM (Y/N): N — 404               * 16
    *                                                                          *
17  * YEAR BUILT: 1983                 FIRE RESISTIVE (Y/N): N — 404           * 17
    *                                                                          *
18  * FIRE DISTRICT: _____                                             * 18
    *                                                                          *
19  *                                                                          * 19
    *                                                                          *
20  * HOME AND/OR CONTENTS COVERAGE (Y/N): Y — 408                             * 20
    *                                                                          *
21  * ------------------------------------------------------------------------ * 21
    *                                                                          *
22  * 1-HOME  2-RETURN  3-DELETE  4-SUSPEND  7-PROCESS  10-HELPERR  11-HELPSCR * 22
    *                                                                          *
23  * 99-END                                                                   * 23
    *                                                                          *
24  * ACTION: 7_____ SELECTION: _____ NUMBER: _____ CLASS: _____ SUBCLASS: _* 24
    ***************************************************************************
    *----+----1----+----2----+----3----+----4----+----5----+----6----+----7----+----8
```

FIG. 10E

```
      *----+----1----+----2----+----3----+----4----+----5----+----6----+----7----+----8
      ***************************************************************************
01  *                                                                      P115*  01
    *                                                                          *
02  * HOME AND/OR CONTENTS COVERAGE                                            *  02
    *                                                                          *
03  * QP NUMBER: 10001374-01            QUOTE VERSION: 1                       *  03
    *                                                                          *
04  * CLIENT NAME: MR. JOHN SMITH                                              *  04
    *                                                                          *
05  * ------------------------------------------------------------------------ *  05
    *                                                                          *
06  * PROPERTY LOCATION NUMBER:   1                                            *  06
    *                                                                          *
07  *                                                                          *  07
    *                                                                          *
08  * VALUE OF BUILDING OR ADDITIONS,ALTERATIONS: $ 150,000___ —410            *  08
    *                                                                          *
09  * VALUE OF CONTENTS: $ 75,000___ —412                                      *  09
    *                                                                          *
10  * VALUE OF ADDITIONAL STRUCTURES: $ _____                                *  10
    *                                                                          *
11  *                                                                          *  11
    *                                                                          *
12  * TYPE OF CONTENTS COVERAGE (DELUXE,STANDARD,FIRE): DELUXE__ —414          *  12
    *                                                                          *
13  * EARTHQUAKE (Y/N): N —422                                                 *  13
    *                                                                          *
14  * LIABILITY (PERSONAL,EXCESS,BOTH,NONE): PERSONAL  —416                    *  14
    *                                                                          *
15  * DEDUCTIBLE: $ 500___ —418                                                *  15
    *                                                                          *
16  * ACTUAL CASH VALUE CREDIT FOR CONTENTS (Y/N): N —420                      *  16
    *                                                                          *
17  *                                                                          *  17
    *                                                                          *
18  * WORKERS COMPENSATION (Y/N): N        PRIOR LOSS INFO (Y/N): N            *  18
    *                                                                          *
19  * MORTGAGEE (Y/N): N                   OTHER INTERESTED PARTY (Y/N): N     *  19
    *                                                                          *
20  * ADDITIONAL LOCATIONS (Y/N): N                                            *  20
    *                                                                          *
21  * ------------------------------------------------------------------------ *  21
    *                                                                          *
22  * 1-HOME  2-RETURN   4-SUSPEND   7-PROCESS   10-HELPERR   11-HELPSCR  99-END*  22
    *                                                                          *
23  *                                                                          *  23
    *                                                                          *
24  * ACTION: 7___  SELECTION: ___  NUMBER: ___  CLASS: ___  SUBCLASS: _       *  24
      ***************************************************************************
      *----+----1----+----2----+----3----+----4----+----5----+----6----+----7----+----8
```

FIG. 10F

```
*----+----1----+----2----+----3----+----4----+----5----+----6----+----7----+----8
*****************************************************************************
01 *                                                                      P117*  01
   *                                                                          *
02 * VALUABLE ARTICLES                                                         *  02
   *                                                                          *
03 * QP NUMBER: 10001374-01          QUOTE VERSION: 1                          *  03
   *                                                                          *
04 * CLIENT NAME: MR. JOHN SMITH                                               *  04
   *                                                                          *
05 * ------------------------------------------------------------------------- *  05
   *                                                                          *
06 * PROPERTY LOCATION NUMBER:   1 ~ 410                                       *  06
   *                                                                          *
07 * STREET: 55 MAPLE AVE            CITY: CAMP POINT                          *  07
   *                                                                          *
08 * STATE: ILL                      ZIP: 66666              412               *  08
   *                                                          ∫                *
09 *                                                                           *  09
   *                                                                          *
10 *             BLANKET AMOUNT  ITEMIZED AMOUNT  TOTAL AMOUNT  IN-VAULT AMOUNT* 10
   *                                                                          *
11 * JEWELRY:    $ 10,000___     $ _____     $ 10,000___   $ _____    * 11
   *                                                                          *
12 * FUR:        $ _____     $ _____     $ _____                  * 12
   *                                                                          *
13 * FINE ARTS:  $ 5,000___      $ _____     $ 5,000___                   * 13
   *                                                                          *
14 * SILVERWARE: $ _____     $ _____     $ _____                  * 14
   *                                                                          *
15 * CAMERAS:    $ _____     $ _____     $ _____                  * 15
   *                                                                          *
16 * STAMPS:     $ _____     $ _____     $ _____                  * 16
   *                                                                          *
17 * COINS:      $ _____     $ _____     $ _____                  * 17
   *                                                                          *
18 * MUSICAL INSTRU: $ _____     $ _____     $ _____                  * 18
   *                                                                          *
19 * OTHER:                      $ _____     $ _____                  * 19
   *                                                                          *
20 * ITEMIZED ARTICLES (Y/N): N         PRIOR LOSS INFORMATION (Y/N): N       * 20
   *                                                                          *
21 * ------------------------------------------------------------------------- * 21
   *                                                                          *
22 * 1-HOME   2-RETURN   3-DELETE   4-SUSPEND   7-PROCESS   10-HELPERR   11-HELPSCR* 22
   *                                                                          *
23 * 99-END                                                                    * 23
   *                                                                          *
24 * ACTION: 7____  SELECTION: _____  NUMBER: ____ CLASS: ____ SUBCLASS: _  * 24
*****************************************************************************
*----+----1----+----2----+----3----+----4----+----5----+----6----+----7----+----8
```

FIG. 10G

```
     *----+----1----+----2----+----3----+----4----+----5----+----6----+----7----+----8
     ***********************************************************************************
     *                                                                                 *
  01 *                                                                           P127* 01
     *                                                                                 *
  02 * POLICY PREMIUM SUMMARY                                                          * 02
     *                                                                                 *
  03 * QP NUMBER: 10001374-01                                                          * 03
     *                                                                                 *
  04 * CLIENT NAME: MR. JOHN SMITH                                                     * 04
     *                                                                                 *
  05 * ------------------------------------------------------------------------------- * 05
     *                                                                                 *
  06 * COVERAGES        VERSION 1                                                      * 06
     *                                                                                 *
  07 *                                                                                 * 07
     *                                                                                 *
  08 * HOMES/CONTENT         597.00  ——424                                             * 08
     *                                                                                 *
  09 * VAL. ARTICLES         189.00                                                    * 09
     *                                                                                 *
  10 *                                                                                 * 10
     *                                                                                 *
  11 *                                                                                 * 11
     *                                                                                 *
  12 *                                                                                 * 12
     *                                                                                 *
  13 *                                                                                 * 13
     *                                                                                 *
  14 *                                                                                 * 14
     *                                                                                 *
  15 *                                                                                 * 15
     *                                                                                 *
  16 *                                                                                 * 16
     *                                                                                 *
  17 * TOTAL                 786.00                                                    * 17
     *                                                                                 *
  18 * DESCRIPTION                                                                     * 18
     *                                                                                 *
  19 *                                                                                 * 19
     *                                                                                 *
  20 * REVIEW VERSION NO: 1   _ _ _                                                    * 20
     *                                                                                 *
  21 * ------------------------------------------------------------------------------- * 21
     *                                                                                 *
  22 * 1-HOME   2-RETURN     7-PROCESS    10-HELPERR   11-HELPSCR    99-END            * 22
     *                                                                                 *
  23 *                                                                                 * 23
     *                                                                                 *
  24 * ACTION: 7_____  SELECTION: ISSUE_____ TYPE: ___                                * 24
     ***********************************************************************************
     *----+----1----+----2----+----3----+----4----+----5----+----6----+----7----+----8
                                          426
```

FIG. 10H

```
*----+----1----+----2----+----3----+----4----+----5----+----6----+----7----+----8
****************************************************************************
01 *                                                              P110*  01
   *                                                                  *
02 * QUOTE/POLICY SELECTIONS                                           *  02
   *                                                                  *
03 * ----------------------------------------------------------------- * 03
   *                                                                  *
04 * A) CALCULATE      G) GENERAL RISK    M) VAC           S) WATERCRAFT * 04
   *                                                                  *
05 * B) PREM SUMMARY   H) LIMITS          N) VAC ITEMIZED  T) LOSS INFO  * 05
   *                                                                  *
06 * C) ERROR REVIEW   I) DEDUCTIBLES     O) BANK VAULT    U) MORTGAGEE  * 06
   *                                                                  *
07 * D) ISSUE          J) PROPERTY LOC    P) HOUSE MEMBER  V) INT PARTY  * 07
   *                                                                  *
08 * E) OUT OF VAULT   K) HOME/CONTENT    Q) VEHICLE       W) STATE EXCEPT * 08
   *                                                                  *
09 * F)                L) WORK COMP       R) UM/PIP                     * 09
   *                                                                  *
10 *                                                                  * 10
   *                                                                  *
11 * LETTER: _                                                        * 11
   *                                                                  *
12 * FOR B ENTER TYPE: ___          FOR J,K,L ENTER LOCATION NO: ___   * 12
   *                                                                  *
13 * FOR O,P,Q,S,T ENTER NO: ___    FOR R ENTER STATE: ___             * 13
   *                                                                  *
14 * FOR E,N ENTER NO: _____ CLASS: _____ SUBCLASS: _ UPDATE VAC AMTS (Y/N): _ * 14
   *                                                                  *
15 * FOR U ENTER NO: ___   LOCATION NO: ___                            * 15
   *                                                                  *
16 * FOR V ENTER NO: ___   TYPE: ___   TYPE NUMBER: ___                * 16
   *                                                                  *
17 * FOR W ENTER TYPE: _____     TYPE NUMBER: ___                  * 17
   *                                                                  *
18 * QUOTE/POLICY NO: 10001374 - 01     EFFECTIVE DATE(MMDDYY): _____ * 18
   *                                                                  *
19 * TRANSACTION: NL__                  CREATE VERSION NO: _           * 19
   *                                                                  *
20 * MODIFY/REVIEW VERSION NO: 1 _ _ _  QUOTE DESCRIPTION: _____  * 20
   *                                                                  *
21 * ----------------------------------------------------------------- * 21
   *                                                                  *
22 * YOUR POLICY HAS BEEN ISSUED AS REQUESTED                          * 22
   *                                                                  *
23 *                                                                  * 23
   *                                                                  *
24 * ACTION: 7_____                                                   * 24
****************************************************************************
*----+----1----+----2----+----3----+----4----+----5----+----6----+----7----+----8
```

FIG. 11A

```
*----+----1----+----2----+----3----+----4----+----5----+----6----+----7----+----8
*****************************************************************************
*                                                                            *
01 *                                                                     P107* 01
   *                                                                         *
02 * UPDATE POLICY                                                            * 02
   *                                                                         *
03 * QP NUMBER: 10001374-01              QUOTE VERSION: 1                    * 03
   *                                                                         *
04 * CLIENT NAME: MR. JOHN SMITH                                              * 04
   *                                                                         *
05 * -----------------------------------------------------------------------* 05
   *                                                                         *
06 * MAILING ADDRESS: 55 MAPLE AVE —428                                       * 06
   *                                                                         *
07 * CITY: CAMP POINT —430           COUNTY: ADAMS —434                       * 07
   *                                                                         *
08 * STATE: ILL —432                 ZIP: 66666 —436                          * 08
   *                                                                         *
09 * PRODUCER: 30301 —438                                                     * 09
   *                                                                         *
10 * SUB PRODUCER: 000                                                        * 10
   *                                                                         *
11 * UPDATE QUOTE (Y/N): N                                                    * 11
   *                                                                         *
12 * ENDORSEMENT (Y/N): Y                                                     * 12
   *                                                                         *
13 * CANCELLATION (Y/N): N                                                    * 13
   *                              —440                                       *
14 * REINSTATEMENT (Y/N): N                                                   * 14
   *                                                                         *
15 * RETYPE (Y/N): N                                                          * 15
   *                                                                         *
16 * NON RENEWAL (Y/N): N                                                     * 16
   *                                                                         *
17 * SPECIAL CHANGES (Y/N): N                                                 * 17
   *                                                                         *
18 * (CHANGE EFFECTIVE DATE, WRITING COMPANY, BILLING, PAYMENT PLAN, COMMISSION) * 18
   *                                                                         *
19 * LAST CHANGE DATE (MMDDYY): 111185                                        * 19
   *                                                                         *
20 * EFFECTIVE DATE (MMDDYY): 121185     DATE RECEIVED (MMDDYY): 121185       * 20
   *                              442                                        *
21 * -----------------------------------------------------------------------* 21
   *                                                                         *
22 * 1-HOME      7-PROCESS    10-HELPERR    11-HELPSCR       99-END           * 22
   *                                                                         *
23 *                                                                         * 23
   *                                                                         *
24 * ACTION: 7_____                                                           * 24
*****************************************************************************
*----+----1----+----2----+----3----+----4----+----5----+----6----+----7----+----8
```

FIG. 11B

```
      *----+----1----+----2----+----3----+----4----+----5----+----6----+----7----+----8
      ***************************************************************************
      *                                                                           *
  01  *                                                                    P110*  01
      *                                                                           *
  02  * QUOTE/POLICY SELECTIONS                                                   *  02
      *                                                                           *
  03  * -------------------------------------------------------------------------*  03
      *                                                                           *
  04  * A) CALCULATE       G) GENERAL RISK    M) VAC            S) WATERCRAFT    *  04
      *                                                                           *
  05  * B) PREM SUMMARY    H) LIMITS          N) VAC ITEMIZED   T) LOSS INFO     *  05
      *                                                                           *
  06  * C) ERROR REVIEW    I) DEDUCTIBLES     O) BANK VAULT     U) MORTGAGEE     *  06
      *                                                                           *
  07  * D) ISSUE           J) PROPERTY LOC    P) HOUSE MEMBER   V) INT PARTY     *  07
      *                                                                           *
  08  * E) OUT OF VAULT    K) HOME/CONTENT    Q) VEHICLE        W) STATE EXCEPT  *  08
      *                                                                           *
  09  * F)                 L) WORK COMP       R) UM/PIP                          *  09
      *                                                            444            *
  10  *                                                                           *  10
      *                                                                           *
  11  * LETTER: P  446                                                            *  11
      *                                                                           *
  12  * FOR B ENTER TYPE: ___            FOR J,K,L ENTER LOCATION NO: ___         *  12
      *                                                                           *
  13  * FOR O,P,Q,S,T ENTER NO: ___      FOR R ENTER STATE: ___                   *  13
      *                                                                           *
  14  * FOR E,N ENTER NO: _____ CLASS: _____ SUBCLASS: _ UPDATE VAC AMTS (Y/N): _ *  14
      *                                                                           *
  15  * FOR U ENTER NO: ___    LOCATION NO: ___                                   *  15
      *                                                                           *
  16  * FOR V ENTER NO: ___    TYPE: ___    TYPE NUMBER: ___                      *  16
      *                                                              448          *
  17  * FOR W ENTER TYPE: _____         TYPE NUMBER: ___                        *  17
      *                                                                           *
  18  * QUOTE/POLICY NO: 10001374 - 01     EFFECTIVE DATE(MMDDYY): ||||||         *  18
      *                                                                           *
  19  * TRANSACTION: ENDT                  CREATE VERSION NO: 1                   *  19
      *                                                                           *
  20  * MODIFY/REVIEW VERSION NO: _ _ _ _  QUOTE DESCRIPTION: _____           *  20
      *                                                                           *
  21  * -------------------------------------------------------------------------*  21
      *                                                                           *
  22  * 1-HOME    7-PROCESS   10-HELPERR   11-HELPSCR    99-END                   *  22
      *                                                                           *
  23  *                                                                           *  23
      *                                                                           *
  24  * ACTION: 7___                                                              *  24
      ***************************************************************************
      *----+----1----+----2----+----3----+----4----+----5----+----6----+----7----+----8
```

FIG. 11C

```
     *----+----1----+----2----+----3----+----4----+----5----+----6----+----7----+----8
     ************************************************************************
     *                                                                      *
01   *                                                                P120  * 01
     *                                                                      *
02   * HOUSEHOLD MEMBERS                                                    * 02
     *                                                                      *
03   * QP NUMBER: 10001374-01            QUOTE VERSION: 1                   * 03
     *                                                                      *
04   * CLIENT NAME: MR. JOHN SMITH                                          * 04
     *                                                                      *
05   * _____    * 05
     *                                                                      *
06   * MEMBER NUMBER:   1                                                   * 06
     *                                                                      *
07   * FIRST NAME: JOHN_____       MIDDLE: D._____                 * 07
     *                                                                      *
08   * LAST: SMITH_____                          * 08
     *                                                                      *
09   * SUFFIX: ____                                                         * 09
     *                                                                      *
10   * SEX (M/F): M                      DATE OF BIRTH (MMDDYY): 101550     * 10
     *                                                                      *
11   *                                                                      * 11
     *                                                                      *
12   * DRIVERS LICENSE NUMBER: S99999999999_____                          * 12
     *                                                                      *
13   * STATE ISSUED: ILL_                LICENSED SINCE (MMYY): 1067        * 13
     *                                                                      *
14   * OPERATOR OF VEHICLE NUMBER: 1__   BUSINESS USE (Y/N): N              * 14
     *                                                                      *
15   * DRIVES TO WORK/SCHOOL (Y/N): Y                                       * 15
     *                                                                      *
16   * (MORE THAN TWICE A WEEK AND OVER 15 MILES EACH WAY)                  * 16
     *                                                                      *
17   * FINANCIAL RESPONSIBILITY (Y/N): N                                    * 17
     *                                                                      *
18   *                                                                      * 18
     *                                                                      *
19   * PRIOR LOSS/VIOLATION (Y/N): N     ADDITIONAL MEMBERS (Y/N): N        * 19
     *                                                                      *
20   *                                                                      * 20
     *                                                                      *
21   * -------------------------------------------------------------------- * 21
     *                                                                      *
22   * 1-HOME  2-RETURN   3-DELETE  4-SUSPEND   7-PROCESS  10-HELPERR  11-HELPSCR * 22
     *                                                                      *
23   * 99-END                                                               * 23
     *                                                                      *
24   * ACTION: 7_____  SELECTION: _____  NUMBER: _____ CLASS: _____ SUBCLASS: _* 24
     ************************************************************************
     *----+----1----+----2----+----3----+----4----+----5----+----6----+----7----+----8
```

FIG. 11D

```
*----+----1----+----2----+----3----+----4----+----5----+----6----+----7----+----8
**********************************************************************************
*                                                                                *
01 *                                                                       P121* 01
   *                                                                            *
02 * VEHICLES                                                                  * 02
   *                                                                            *
03 * QP NUMBER: 10001374-01              QUOTE VERSION: 1                      * 03
   *                                                                            *
04 * CLIENT NAME: MR. JOHN SMITH                                               * 04
   *                                         452          454                  *
05 * -----------------------------------------/------------)------------------* 05
   *                                                                            *
06 * VEHICLE NUMBER:   1      450        YEAR: 1985  MAKE: FORD_____         * 06
   *                                                                            *
07 * MODEL: EXP_____         458       BODY TYPE: COUPE_____  456         * 07
   *                                                                            *
08 * VIN/SERIAL NUMBER: 1FAB34SF78301___  HIGH PERFORMANCE/SPORTS CAR (Y/N): N * 08
   *                                                                  468       *
09 * STATE REGISTERED: ILL_  460         COMPANY OWNED (Y/N): N                * 09
   *                                                              470           *
10 * VEHICLE CODE: P      462            MOTORCYCLE (CC): ____         472     * 10
   *                                                                            *
11 * ORIGINAL COST NEW: $ _____  474   GARAGED IN CITY: CAMP POINT____       * 11
   *                                                                            *
12 * COUNTY: ADAMS_____    464        STATE: ILL_  ZIP: 66666     476       * 12
   *                                                                            *
13 * TERRITORY: ___                      CITY/COUNTY CODE: _____              * 13
   *                                                                            *
14 * AGREED VALUE: $ _____             MARKET VALUE (Y/N): Y                 * 14
   *                                                              478           *
15 * AVERAGE RETAIL COST: $ _____                                            * 15
   *                                                                            *
16 * COMP AND COLLISION (Y/N): Y   466   COMP ONLY (Y/N): N    480             * 16
   *                                                                            *
17 * LIABILITY (VEHICLE,EXCESS,BOTH,NONE): VEHICLE    482                      * 17
   *                                                                            *
18 * DEDUCTIBLE: $ 500___                                                      * 18
   *                                                                            *
19 *                                                                           * 19
   *                                                                            *
20 * OTHER INTERESTED PARTY (Y/N): N     ADDITIONAL VEHICLES (Y/N): N          * 20
   *                                                                            *
21 * ------------------------------------------------------------------------ * 21
   *                                                                            *
22 * 1-HOME   2-RETURN   3-DELETE   4-SUSPEND   7-PROCESS   10-HELPERR   11-HELPSCR * 22
   *                                                                            *
23 * 99-END                                                                    * 23
   *                                                                            *
24 * ACTION: 7_____  SELECTION: _____  NUMBER: ____ CLASS: _____ SUBCLASS: _ * 24
**********************************************************************************
*----+----1----+----2----+----3----+----4----+----5----+----6----+----7----+----8
```

FIG. 11E

```
    *----+----1----+----2----+----3----+----4----+----5----+----6----+----7----+----8
    ************************************************************************************
    *                                                                                  *
01  *                                                                          P122*   01
    *                                                                                  *
02  * VEHICLE STATE COVERAGES                                                           * 02
    *                                                                                  *
03  * QP NUMBER: 10001374-01              QUOTE VERSION: 1                              * 03
    *                                                                                  *
04  * CLIENT NAME: MR. JOHN SMITH                                                       * 04
    *                                                                                  *
05  * ---------------------------------------------------------------------------------* 05
    *                                                                                  *
06  *                                                                                  * 06
    *                                                                                  *
07  * STATE: ILL                                                                        * 07
    *                                                                                  *
08  *                                                                                  * 08
    *                                                                                  *
09  * UM CODE: C  —484                                                                  * 09
    *                                                                                  *
10  *                                                                                  * 10
    *                                                                                  *
11  *                                                                                  * 11
    *                                                                                  *
12  *                                                                                  * 12
    *                                                                                  *
13  *                                                                                  * 13
    *                                                                                  *
14  *                                                                                  * 14
    *                                                                                  *
15  *                                                                                  * 15
    *                                                                                  *
16  *                                                                                  * 16
    *                                                                                  *
17  *                                                                                  * 17
    *                                                                                  *
18  *                                                                                  * 18
    *                                                                                  *
19  *                                                                                  * 19
    *                                                                                  *
20  *                                                                                  * 20
    *                                                                                  *
21  * ---------------------------------------------------------------------------------* 21
    *                                                                                  *
22  * PLEASE ENTER A UM CODE - THIS INFORMATION IS REQUIRED                             * 22
    *                                                                                  *
23  *                                                                                  * 23
    *                                                                                  *
24  * ACTION: 7_____  SELECTION: _____  NUMBER: _____  CLASS: _____  SUBCLASS: _ * 24
    ************************************************************************************
    *----+----1----+----2----+----3----+----4----+----5----+----6----+----7----+----8
```

FIG. 11F

```
     *----+----1----+----2----+----3----+----4----+----5----+----6----+----7----+----8
     ************************************************************************
   * *                                                                      *
01 * *                                                                P127* 01
   * *                                                                      *
02 * POLICY PREMIUM SUMMARY                                                  * 02
   *                                                                        *
03 * QP NUMBER: 10001374-01                                                  * 03
   *                                                                        *
04 * CLIENT NAME: MR. JOHN SMITH                                             * 04
   *                                                                        *
05 * -----------------------------------------------------------------------* 05
   *                                                                        *
06 * COVERAGES        VERSION 1                                              * 06
   *                                                                        *
07 *                                                                        * 07
   *                                                                        *
08 *                                                                        * 08
   *                                                                        *
09 *                                                                        * 09
   *                                                                        *
10 * VEHICLES            288.00 —— 486                                       * 10
   *                                                                        *
11 *                                                                        * 11
   *                                                                        *
12 *                                                                        * 12
   *                                                                        *
13 *                                                                        * 13
   *                                                                        *
14 *                                                                        * 14
   *                                                                        *
15 *                                                                        * 15
   *                                                                        *
16 *                                                                        * 16
   *                                                                        *
17 * TOTAL               288.00                                              * 17
   *                                                                        *
18 * DESCRIPTION                                                             * 18
   *                                                                        *
19 *                                                                        * 19
   *                                                                        *
20 * REVIEW VERSION NO: 1  _ _ _                                             * 20
   *                                                                        *
21 * -----------------------------------------------------------------------* 21
   *                                                                        *
22 * 1-HOME   2-RETURN    7-PROCESS   10-HELPERR    11-HELPSCR    99-END    * 22
   *                                                                        *
23 *                                                                        * 23
   *                                                                        *
24 * ACTION: 7_____  SELECTION: _____  TYPE: ____                      * 24
     ************************************************************************
     *----+----1----+----2----+----3----+----4----+----5----+----6----+----7----+----8
                                        488
```

COMPUTERIZED INSURANCE PREMIUM QUOTE REQUEST AND POLICY ISSUANCE SYSTEM

BACKGROUND OF THE INVENTION

This invention relates to a computerized system for preparing and processing applications and premium quotations for insurance coverage, and for preparing and writing insurance contracts requested by clients.

Prior to the invention described below, insurance underwriting has been conducted primarily by manually reviewing and evaluating voluminous and often redundant client information and application forms. These forms are normally supplied by each insurance company to individual agents in the field and must be updated and/or replaced periodically in response to changes in individual company's standards or legislative enactments in the state in which the insured risk resides. Typically, each insurance transaction, application, or request for information requires a separate document to be filled out by the client and/or agent. Due to the general nature of these forms, much of the information entered by the client or the agent is redundant and serves only to contribute to the tremendous volume of paper which must be transmitted and reviewed in order to create an average insurance policy. When changes and supplements to information previously given by the client are necessary, even more forms and duplicate information are generated, which further contribute to the mass of information previously submitted. This is because, in order to transmit new information to the proper file, these change or supplement forms require the entry of client and/or risk information previously submitted on application forms already in the client's file.

This system as it now exists is inefficient and time consuming for the client, the agent and the underwriter. It is especially time consuming for the underwrieer because of the volumes of forms and information that must be reviewed for errors, non sequiturs, insufficient and/or incomplete information regarding the client or the risk to be insured. If any of these deficiencies are identified, the underwriter must draft and send correspondence to the agent or the client in order to correct, clarify or supplement the underwriter files. Once the files have been placed in proper order, the specific client and risk information are manually combined into a policy which then is submitted to the individual client for his review and approval.

The policy generated by this method typically is of a standard form to which individual paragraphs or pages must be added or deleted depending upon the specific risk to be nnsured and/or the individual client. In cases where the client requests supplemental coverage or wants to add further risks to his policy, riders, or in some cases entirely new policies, must be written and resubmitted to the client for approval. These policies tend to be bulky and confusing, since their format usually is not alterable. As a result, client and risk information are fitted to the policy rather than the policy being adapted to the client and to the risk.

The Insurance Institute for esearch (IIR) has proposed a common application form for each type of personal insurance, in an attempt to overcome some of the difficulties inherent in current insurance underwriting methods. These forms theoretically could be recorded in the memory system of an agent's personal computer so that they could be filled out electronically and the data sent to an insurance carrier in a "batch" environment. As used herein, the expression "batch" means a plurality of separate insurance transactions and/or information entered during a single operation of a terminal. The basic thrust of the IIR has been the creation of standardized application forms and records which can be used with any insurance carrier and which can be sent to a carrier in a batch input record. This proposal, however, still suffers from the same problems as those encountered previously. For example, the application forms of the IIR system require the entry of client and risk identification information each time an application form is filled out; and these application forms must still be edited and reviewed by the underwriter who must continue to conduct the aforementioned error analysis as well as the insufficient or incorrect data analysis mentioned above.

OBJECTS OF THE INVENTION

Therefore, it is an object of the present invention to provide a computerized insurance system which avoids the aforenoted disadvantages of prior art systems, and which can produce a finally printed document tailored to an individual client and risk.

Another object of this invention is to provide a computerized insurance system and method of operating that system, in which a common application form is filled in electronically for the dual purpose of writing an insurance policy or quoting a premium for that policy.

A further object of this invention is to provide a computerized insurance system which utilizes a cnntral computer coupled, via suitable communication channels, to various terminals and display units whereat an operator may access and supplement client and risk information on request An additional object of this invention is to provide a computerized insurance system incorporating a central data base into which data is written and from which data is read in order to supplement a client's application, thus avoiding repetitive entry of the same information.

Another object of the present invention is to provide a computerized insurance system which can electronically display an application for the purpose of approval/disapproval on request.

A further object of this invention is to provide a computerized insurance system having broad storage capacity and look up tables which correlate information repeatedly called for on insurance policies.

Various other objects, advantages and features of the present invention will become readily apparent from the ensuing detailed description, and the novel features will be particularly pointed out in the appended claims.

SUMMARY OF THE INVENTION

In accordance with a broad, general feature of this invention, a computerized insurance system and method of operating that system are provided. A central processor is at the heart of the system and includes a data bank into which data is written and from which data is read (as used hereinafter, the expression "central processor" is intended to refer to the computer system coupled to a terminal in a remote office connected thereto). That data includes information regarding the particular risk to be insured, client information, insurance premium information and predetermined text data for incorporation into insurance contracts. The data bank further includes information representing laws and regulations of individual state governments which control and regulate the various parameters of insurance contracts such as liability rates and amounts of coverage.

Plural terminals are provided for communicating with the central processor, each terminal having an input, such as a keyboard, and a display, such as a cathode ray tube (CRT) or video display terminal (VDT). Each terminal is operable by an operator to produce requests and to enter information and/or retrieve information for writing into and/or reading from the data bank in the central processor. The central processor is provided with means for enabling access to the data bank in response to predetermined information entered at the terminal by the operator and is suitably programmed to recognize particular authorizations.

In accordance with one desirable aspect, information regarding a risk and other data needed to write insurance for that risk is keyed into the central processor by an operator, such as, but not limited to, an agent using a keyboard and a video display terminal. To assist the operator in entering the appropriate data, a series of data comprising a "form" is displayed on his terminal by the central processor, and he merely enters the pertinent information in the blanks provided. This information constitutes such things as the insured's name and address, the risk to be insured, the limit of the insurance, and any other information necessary in providing a policy application or premium quotation. Although all of the data requested by the form must be completed in order to proceed with writing the insurance policy, for the purpose of quoting the premium which would be due, only certain minimal information need be entered. This information is correlated in the central processor, resulting in premium quotation data which is then transmitted back and displayed at the operator's terminal. Thus, in a matter of seconds, a prospective client is apprised of the cost of his insurance.

Once all of the data called for by the "form" is entered into the system at the operator's keyboard, a complete client file, or data base, is established which includes information regarding all of the risks that are to be insured, the premium cost for each such insured risk and other pertinent data relating to the client. Once this data base is established, if the client later seeks additional coverage or insurance for a different risk, client-related information necessary for the additional coverage need not be entered again by the agent but can be supplied from the data base itself.

An alternative technique for entering client data into the system, rather than entering this data directly at an agent's terminal, is to have the prospective client manually complete an insurance form which is mailed to the company and entered into the computer system directly by terminal operators at the company's location.

After the input data has been compiled in the client data base, errors or omissions in that data (e.g. the amount of requested insurance may be omitted or may be too high, certain necessary data fields may have been omitted, etc.) are detected; and if these errors cannot be corrected immediately (as by supplying omitted information from the existing client data base), further processing of the insurance policy is suspended and either the prospective client or the agent is notified of the need for additional information or correction of errors.

If the insurance policy is to be written, for example, if the client agrees that the premium is acceptable, a formal contract is printed as a function of the client data base. This contract is substantially simplified over existing insurance contracts and is created to be custom tailored for the particular client and risk involved. This is contrary to current practice wherein the client and the risk must be incorporated into existing standard contracts. Thss custom tailoring is achieved by a compiling and editing function in the central processor in which data representing predetermined form paragraphs are stored, and those paragraphs which are applicable to the particular insurance contract requested are selected. Blanks in those paragraphs which must be filled in by, for example, specific dollar amounts, descriptions of the property to be insured, etc. are retrieved from the client data base and merged into the form paragraphs stored in the central processor. These separate and complete paragraphs are then sequenced by the processor for printing in the desired order to yield an insurance contract which is tailored to the client and the risk. Thus, contrary to present day insurance contracts in which items that are not applicable are merely left blank and items that vary from state to state are set out in various separate endorsements and attachments, the printed contract which is created by the instant computerized system is totally and efficiently customized to the client and the insured risks.

In most instances, concurrently with the writing and mailing of the insurance contract to the client, the information included in the original application is electronically stored and displayed, on request to underwriter personnel. Should the underwriter decide not to proceed with the insurance, it is cancelled. Alternatively, should the underwriter decide to make variations, he may do so electronically, and these variations appear in a subsequently printed and mailed policy. Before actually proceeding with the printing of the insurance contract, data included in the insurance application is electronically and automatically compared to certain underwriting criteria and if any of these standards is exceeded, the aforementioned underwriting function is carried out before the insurance contract is printed and mailed. That is, in the first-mentioned case, underwriting is carried out concurrently with the issuance of the policy. In the second-mentioned case, a "pre-underwriting" operation is carried out before the policy is mailed; this pre-underwriting step being triggered by certain data that exceed the insurance company standards.

The data base is updated in the event that certain additional reports, appraisals or inquiries are needed before the issuance or finalization of the actual insurance contract. Furthermore, the data base is used to send renewals to the client or to induce him into purchasing other insurance. The client data base is also used for "quality control" or "management reports" by which management can ascertain the specifics of the insurance operation, such as the types of risks that are insured, the locations of those risks, the productivity of various agents, and other demographic data regarding clients.

BRIEF DESCRIPTION OF THE DRAWINGS

The following detailed description, given by way of example, and not intended to limit the present invention solely to the described embodiments, will best be understood in conjunction with the accompanying drawings in which:

FIGS. 2A–2F represent a schematic flow chart depicting the computerized processing methodology and structure in accordance with the principles of the present invention.

FIG. 7 is a menu screen displayed to an agent to institute insurance business;

FIG. 8 is an operations menu screen for initiating review and evaluation by operations personnel of data sent by an agent;

FIG. 9 is a menu displayed to an underwriter in order to institute underwriting activity;

FIGS. 10A–10H depict, in seriatim the series of display screens which appear when an agent chooses to create a home policy for a new client; and FIGS. 11A–11F depict, in seriatim the display screens which appear when an agent chooses to add a vehicle to an existing policy for an existing client.

DETAILED DESCRIPTION OF A PREFERRED EMBODIMENT

The following detailed description is intended to provide an understanding of the manner in which the computerized insurance system of the present invention is implemented and operates. Some of the particular insurance transactions that are carried out by this system are described in detail. Other transactions are described more generally. In the interests of brevity a detailed description of each and every one of the insurance data transactions that may be carried out by the computerized system of the present invention is not provided. Based upon the detailed description of certain examples, taken in conjunction with the state of the programming art, the knowledge of those of ordinary skill in that programming art, and the knowledge of those familiar with the insurance industry, particular programs, routines and sub-routines for carrying out those insurance transactions which are described broadly will become readily apparent.

Figure 1:
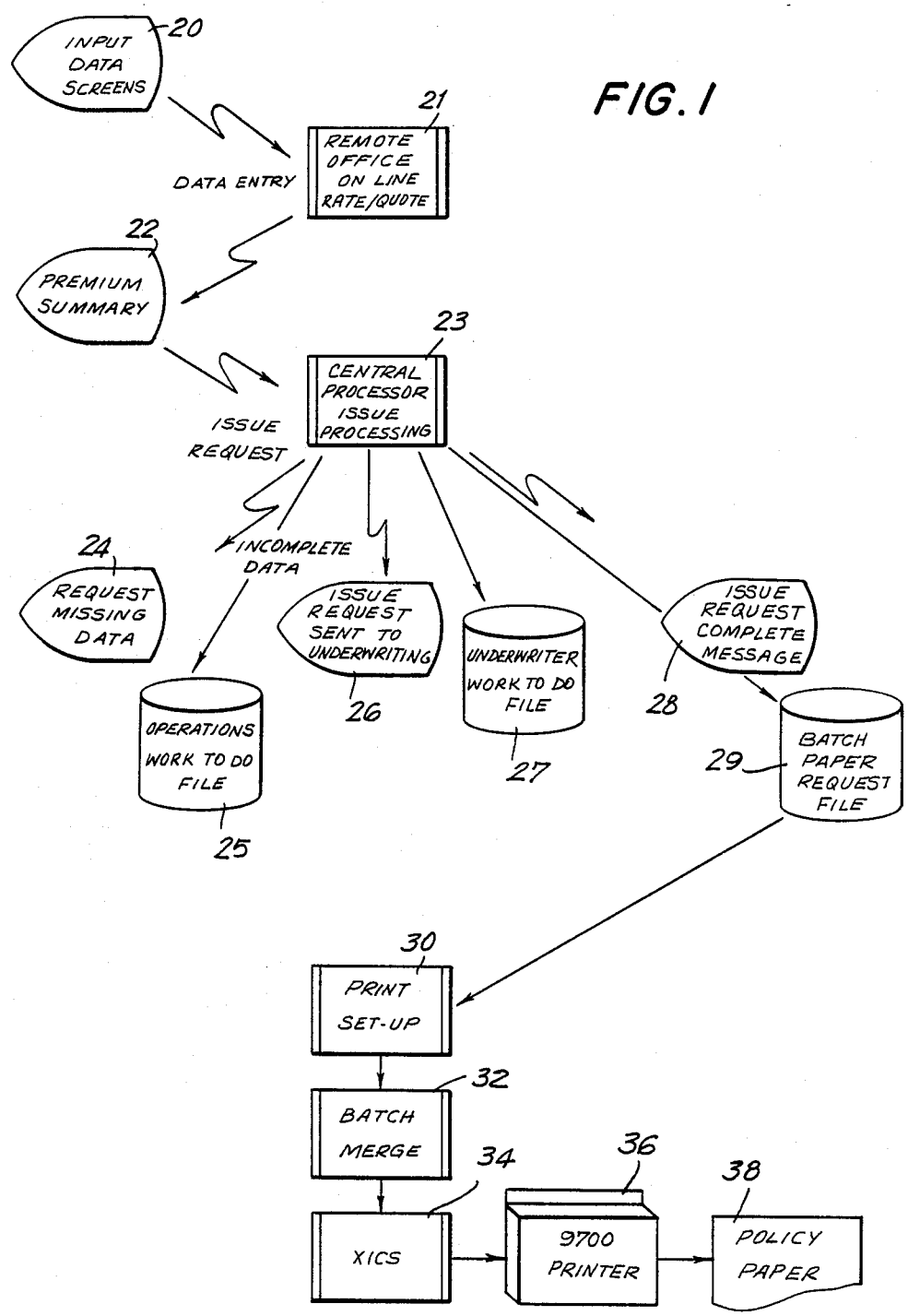
FIG. 1 is a schematic representation of the computerized insurance system of the present invention.

Referring now to FIG. 1, there is shown in overall scope a data processing and system operational flow chart for implementing an insurance policy input system incorporating the principles of the present invention. As contemplated by one embodiment of the present invention, there are several fundamental functions offered to users of this system, although a greater number of functions may be provided, if desired. A brief overview of each of these functions is now provided as a basis for understanding the overall system.

The first function, termed the input function, generally is the entry point for the overall system. Prior to entry into the system, however, certain preliminaries must be accomplished. The source of most insurance information requests comes from agents, either by telephone, mail or agency-company communications, or from company-generated mailings. The initial processing of these requests generally consists of: manually stamping submitted client application documents with the date received and checking for return name and address; entering applications and assigning client numbers, as well as checking for existing client numbers; reviewing the submitted documents for minimal information which must be provided in order to initiate processing by the system; and collecting certain statistics such as dates, types of business, sources of business, and pre-underwriting criteria for use in reviewing system output. These preliminary steps, although advantageous with this embodiment of the invention, are not necessary to use the system to its best advantage.

Once these preliminary processing steps have been completed a user "logs" on at an individual terminal by entering an assigned authorization password at a terminal which is read by the central processor to determine the level of access to which that particular user is entitled. This authorization system is included in a preferred embodiment of this invention in order to avoid security problems which are created by the diverse number of people using the system. It also provides for confidentiality of individual clients and, in th case of agency-company communications, allows each agent to view only his own client's information.

Once the user has entered his access password and it has been verified by the system, he then chooses the type of transaction which he wishes to carry out. There are two basic types of transactions: one which is multi-client related, such as a review of all items which have been entered and stored over a designated period, for example two weeks; and one which is single-client related, such as the entry of a premium quote request or policy request. For single-client related functions, the client must be identified to the system and in the case of existing clients or new clients with incomplete information, data must be entered or ceded from available files in the central processor data bank. In this embodiment of the present invention there are provided five files into which data is entered and from which data is taken. These files include a prospect file which contains premium quotations that have been previously offered and/or refused by a client. The prospect file also contains current client information for the purpose of writingadditional coverages. A suspense or storage file is provided for general underwriting purposes to maintain reports (such as motor vehicle reports or inspection data), binder, mail, high authority approval, diary, rate hold, early submissions and errors. This file also includes premium quotations which are awaiting client approval to finalize the insurance contract. The data bank also is provided with a file which provides a facility for electronic documentation (and storage if necessary) of individual policies. An inquiry file provides a facility to review current policy information, premium quotations, and work in process. Finally, there is provided a client file which is used to identify individual clients. This file normally contains all data available on the client. This data is provided either by ceding available client information from existing files or inputting mandatory client information such as client name (last, first), client address (street, city, state, zip code) and identifying number of the originator of the insurance, for example, the agent or broker (this is the access number provided by the company for accessing the system).

Once a user enters the system and is given access to the data bank therein, he must chose the transaction which he wishes to carry out. These transactions will vary by user. Sample transactions provided by this system to various users are set out in the chart below. As used below, a "processing clerk" includes personnel who perform the operations function of reviewing submitted data for errors, non sequiturs, and/or incomplete information.

| PROCESSING CLERK | UNDERWRITER | AGENT |
|---|---|---|
| build prospect | build prospect | build prospect |
| quote | quote | quote |
| process: | inquiry; | process; |
| new line | inforce | new line |
| endorsement | quotes | endorsement |
| cancellation | losses | cancellation |
| renewal conversion | prospect | renewal conversion |
| reinstatement | in process | inquiry; |
| inquiry; | billing | inforce |
| inforce | reports | losses |
| losses | underwriting; | prospect |
| prospect | approve | in process |
| in process | decline | billing |
| billing | suspend/release | reports |
| reports (with authority) | notes | electronic mail |
| | order reports | |
| | modification | |
| | (contract/premium) | |
| | cancellation | |
| | reinstatement | |
| | electronic mail | |

The provision of the electronic input function allows a company to speed the turn around time from the time an application is received until the time it is written or declined. Further it allows the company to track applications from the time of entry through final processing to facilitate follow ups where necessary. Also, the input function allows a company to scan input information and stored data to collect statistics which help determine whether the criteria for sending applications to underwriting are realistic.

The second function provided by this preferred embodiment of the present invention is termed the data flow or operations function and is specifically designed to review and edit information entered, or ceded, for integrity and completeness. If errors are located and cannot be resolved while the client and/or user is on-line, such errors would automatically be saved for agent notification and the particular request by the agent would be suspended. Examples of the type of information which is edited and reviewed are set out in the chart below. This information is provided by way of example only and it should be readily apparent to one skilled in the programming or insurance art that the below-listed items could be added to or abbreviated as necessary. As indicated below, the information (or data items) is listed in the left hand column of the chart and the appropriate class of risk is listed horizontally across the top of the chart. An "X" in the column indicates that that particular item of information must be reviewed or edited in order to provide a policy in the appropriate class. As used in the charts below, the term "PEXS" refers to personal excess liability coverage or what is commonly termed "umbrella" coverage.

| DATA ITEM | DWELLING | HOMEOWNER | RENTER | CONDO/COOP | PAF |
|---|---|---|---|---|---|
| Type Policy | X | X | X | X | X |
| Package | X | X | X | X | X |
| Effective/Expiration Dates | X | X | X | X | X |
| Risk location | X | X | X | X | X |
| Generate territory (city/county) code | X | X | X | X | X |
| Value of Structure | X | X | — | — | — |
| Value of Contents | X(opt) | X | X | X | — |
| Protected/Unprotected | X | X | X | X | X |
| Year Built | X | X | — | — | — |
| Liability Limit | X | X | X | X | — |
| (−) Alarm Credit | X | X | X | X | X |
| (−) Construction Credit | X | X | X | X | X |
| (−) Remove Rep. Cost Cont. | — | X | — | — | — |
| (−) Remove Rep. Cost Ext. | X | X | X | X | — |
| (−) Remove Liability | X | X | X | X | — |
| (−) Remove Pers. Injury | X | X | X | X | — |
| (+) Remove Ver. Value | X | X | — | — | — |
| (+/−) Deductible | X | X | X | X | — |
| (+) Add Earthquake | X | X | — | — | — |
| (+) Add Improvements | — | — | X | XX | — |
| (−) Remove Loss Assessment | — | — | X | — | — |
| Amount of insurance by class | — | — | — | — | X |
| Vault credit for jewelry | — | — | — | — | X |

| DATA ITEM | AUTO | WATER CRAFT | MISC. VEH. | PEXS | W/COMP. |
|---|---|---|---|---|---|
| Type of Policy | X | X | X | X | X |
| Package | X | X | X | X | — |
| Eff/Exp Date | X | X | X | X | X |
| Liability Limit | X | X | X | X | — |
| Generate territory (city/county) code | X | X | X | X | X |
| Garage Location/Mooring | X | X | X | — | — |
| State Registered | X | X | X | — | — |
| Residence | — | — | — | X | — |
| Vehicle/Watercraft Description | X | X | X | — | — |
| Model Year | X | X | X | X | — |
| Trade Name | X | X | X | X | — |

-continued

| | | | | | |
|---|---|---|---|---|---|
| Vehicle Type | X | X | X | X | — |
| Model Name | X | X | X | X | — |
| Body Type | X | X | X | X | — |
| Vehicle/Watercraft Value | X | — | X | — | — |
| Agreed Value/ACV | X | X | X | — | — |
| Engine Size (cc) | — | — | X | — | — |
| Length (Boat) | — | X | — | X | — |
| Horsepower | — | X | — | X | — |
| Driver Information | X | — | X | X | — |
| Name | X | — | X | X | — |
| Date of Birth | X | — | X | X | — |
| Sex | X | — | X | X | — |
| License # | X | — | X | X | — |
| License Date | X | — | X | X | — |
| License State | X | — | X | — | — |
| Vehicle Driven | X | — | — | — | — |
| Driven to Work/School | X | — | — | — | — |
| Loss Information | X | — | — | — | — |
| Accidents (Date, AMT.) | X | X | X | — | — |
| Violations (Date, Type) | X | X | X | — | — |
| Coverages | X | X | X | X | — |
| Liability | X | X | X | X | — |
| Medical | X | X | X | — | — |
| U. M. | X | — | X | X | — |
| PIP/XPIP | X | — | X | — | — |
| Physical Damage | X | X | X | — | — |
| Credits | X | — | — | X | — |
| Anti-theft | X | — | — | — | — |
| Defensive Driver | X | — | — | — | — |
| Modifications | X | X | X | — | — |
| phy. Damage deductible | X | X | X | — | — |
| pip deductible | X | — | — | — | — |
| Addl. Names insured | X | X | X | — | — |
| Loss Free Credit | — | — | — | — | — |
| Residence Liability | — | — | — | X | — |
| # of Vehicles Covered | — | — | — | X | — |
| # of Drivers under 21 | — | — | — | X | — |
| Veh. limits of Liab. | — | — | — | X | — |
| Limits of U.M. | — | — | — | X | — |
| Farms | — | — | — | X | — |
| # of Employees | — | — | — | — | X |
| Part/Full Time | — | — | — | — | X |
| In/Out Servants | — | — | — | — | X |

The data flow function avoids numerous duplicate entries of the same information since any data associated with a particular risk or client and previously stored in the data bank will be retrieved for use as each transaction is processed. All that is required for subsequent entry is additional data. As a result, this data flow function also reduces the number of tems which an insurance rater or agent must look up to process a transaction because rating factors such as liability limits, the class of risk, or location of risk, will be looked up automatically in the course of reviewing and editing the entered information.

The third function provided by this embodiment of the computerized insurance system is entitled the underwriting approval function. In general, all policy requests must be approved by the underwriter. In many cases insurance policies do not have to be approved before they are issued, but can be issuedaand underwritten concurrently. Underwriting usually requires the entry and editing of entered information for integrity and completeness, the ceding from the data file of information which is not provided on the submitted application as well as certain characteristics of the risk to be insured which are entered into the data bank, the checking of the suspense file to determine if there are any motor vehicle reports and/or inspections outstanding (if not, and there is sufficient information entered, such reports are ordered from the appropriate state agency by the underwriter), and displaying the client's quotation request for criteria that might require pre-underwriting instead of concurrent underwriting. Insurance policies that require pre-underwriting include requests that require advice from other underwriting branches because of an out-of-state location or requests that include risks which must be approved because they exceed an underwriter's authorized limit. If pre-underwriting is required, the request for an insurance policy is suspended before being forwarded to underwriting.

It will be apparent to one skilled in the art of insurance underwriting that certain criteria and particular limitations may be chosen by the individual underwriters as lines of demarcation for risks which may be concurrently underwritten and risks which require underwriter approval prior to issuance of the policy. Examples of such limitations or lines of demarcation include requests wherein the named insured differs from the individual's and/or spouse's name, where more than five automobiles are requested on an automobile or excess liability policy, where $400,000 or more coverage is requested on a dwelling for a home owner policy, or $100,000 or more coverage is requested for jewelry on a "personal articles floater (PAF) policy or where a single scheduled jewelry item on such a PAF is insured for $50,000 or more, etc.

The benefits of the underwriting approval function include allowing an underwriter to be advised of those risks which need approval while allowing all other risks to be concurrently processed by the system.

The fourth function provided by this system is entitled error suspense. As discussed above, the system allows the entry of information for premium quotation or policy issuance, whether or not all necessary information is input or available in the system. The error suspense function identifies all the information entered and generates error messages that indicate the presence of errors which must be corrected before the transaction can be completed. These error messages note inaccurate information or the need for further information. This embodiment of the system also electronically provides a list of errors to the user for review to remind the user entering the transaction where the errors exist. This function is desirable in that only incorrect or missing data need be corrected and need be entered to complete a transaction. Further, this function allows tracking of transactions which have been suspended for designated errors.

The fifth function provided in this system is termed the underwriting notification function and is provided by an underwriting data base (within the central processing data base) capable of storing client and risk information on current policies as well as underwritten business. This underwriting data base is used to facilitate risk evaluation and underwriter action. The data base is comprised of fourteen components including:

(1) A decline/cancellation file which contains basic policy information on risks declined or cancelled based upon underwriting criteria and/or risks cancelled at the insured's request.

(2) A prospect file (the same file as discussed above with regard to the input function) which includes premium quotations that have been offered to and refused by a client and further includes current client information for the purpose of writing additional coverage.

(3) A suspense file (the same file as discussed above with regard to the input function) which is a general underwriting suspense file for reports, binders, mail, higher authority approval and diary information. This file is provided in the event that the underwriter may require furthe information about a risk after the policy had been issued but before giving final approval. In that case the items will be suspended for post-issuance underwriting.

(4) A premium modification file to permit changes to a premium. By utilizing this file, existing premium rates are adjusted up or down by a percentage determined by the underwriter. This file represents the criteria and technique for premium adjustments and is submitted to state insurance authorities and will provide the underwriter with a format to adjust rates on the policy either prior to issuance or by endorsement.

(5) A consent to rate file, similar to the premium modification file discussed above, however, individual policies are filed with the state insurance agencies rather than filing the method itself.

(6) A loss information directory, which notifies the appropriate underwriter of the occurrence of a loss, utilizes a loss data base within the central data base. There is also provided a directory for the claims department of a typical insurance company to notify the appropriate underwriter of an unusual loss when it occurs.

(7) Manual ordering of reports components which allow the "off-cycle" report ordering by underwriters at their discretion. In this context "off-cycle" refers to soliciting documents and reports such as appraisals or MVR reports manually outside the scope of the system.

(8) An underwriter approval directory wherein the underwriter may approve concurrent and non-concurrent transactions. For non-concurrent (pre-underwritten) transactions, exception explanations are required and approval "triggers" issuance or endorsements.

(9) A cancellation capability wherein an underwriter may execute cancellation transactions which, in the prior art were performed by a separate branch of the insurance company on instructions of the underwriter. In the present system, all policy requests which are not approved by the underwriter are either declined or canceled depending upon whether or not those policies have been issued. If the request requires pre-underwriting or has not yet been issued, the underwriter may decline all or part of the risk. If so, the declination and its reasons are entered in the declined file. If, on the other hand the policy was issued, the underwriter may decline a risk by requesting cancellation. This information also is entered in the declined file. In addition, the prospect file is updated to reflect any risk that has been declined.

(10) A non-renewal file for streamlining non-renewal. Currently, an underwriter initiates non-renewal by completing an "Underwriter Action Entry Form" (UAEF). As a result, a policy otherwise in condition for renewal is not renewed, and the reasons and numbers of policies not to be renewed are entered on a "DO NOT RENEW" (DNR) control list. From this list, the "operations" department of a typical insurance company types up and mails appropriate non-renewal notifications to the insureds. The present system allows direct entry by an underwriter of the DNR order, thus eliminating the need for completion of the UAEF form and the requirement that it be entered by the operations department. It is, however, preferred to produce a DNR control list for management and quality control review.

(11) A reinstatement file which operates in a manner similar to the cancellation method set out above and which allows the underwriter to approve and directly enter input reinstatement orders to the system for processing without requiring that those orders first be forwarded to operations for input.

(12) A notes file (as discussed previously with regard to the input function) which provides a file for electronic documentation (and suspense, if necessary) of individual policies or premium quotations.

(13) A contract modifications file which permits an underwriter to modify a policy through manuscript endorsement on the policy itself and/or separate endorsement.

(14) A self-audit file which allows access to data within the central processing data bank for the purpose of evaluating underwriter/department judgment and/or results.

The benefits of this elaborate underwriting notification function are that it eliminates the requirement for manually preparing and maintaining Decline/Cancellation Files, Prospect Files, and Suspense File Report ordering, as has heretofore been necessary. It further reduces Cancellation, Non-renewal and Reinstatement procedures to a single ste which improves efficiency and service. Also, this function simplifies Premium Modification and the Consent to Rate Change for the underwriter while, at the same time, providing management reports regarding underwriter/branch performance.

The sixth function provided in this embodiment of the new computerized insurance system is termed the Issue Quote/Policy/Binder function. In most cases today, before an insurance policy is written the insured requests from the agent a quotation for the policy. This premium quotation, in addition to the reputation of the insurance company for service and loss settlement, will help the insured decide with which company he or she will do business. Prior art systems require that the quotation be rated manually by the agent utilizing preprinted rate pages. These rate pages are basically look-up tables containing the cost of insuring a given risk possessing given characteristics. With the present system, however, policy quotation may be generated electoonically, on-line and can include any of the following features: a premium break-down on a "by-coverage" basis; alterable quotations utilizing various coverage limits and/or deductibles so that the insured may tailor his policy to his own budget and desires; a requotation of a policy by the agent if rate revision has occurred, or if the information supplied by the insured has changed; and once the quotation has been accepted by the insured, the policy information is added to the client's file in preparation for policy issuance, thereby eliminating the necessity of reentering the same data already supplied by the insured.

Since it is possible for more than one quotation to exist on a given policy, it is necessary that the *accepted* quotation be indicated. A suspense file is created for those quotations which are pending approval by the insured, thus notifying the underwriter that a quotation was given. (The function of this file may be combined with that of the prospect file.) Once the quotation has been accepted by the insured it of course is stored as an integral portion of the policy. Preferably, those quotations which have not been accepted may be stored for a designated period subsequent to the issuance of the policy, for example, 30 days. After the policy has been issued, pending quotations are purged.

Particular aspects of this function include the provision of generating a policy contract which is tailored to the insured and mailed directly to him. In the case of a cancellation or DNR notification, that document will be sen to the insured and to the agent as well as any other parties required to be notified by state regulations.

The seventh function provided by this system is designed to carry out follow-up procedures related to policies. These procedures are provided as a combination of manual and electronic functions. The manual functions include the mailing or transmission of policies, endorsements, cancel/reinstatement notices, DNR notices, motor vehicle reports (MVR), inspections, etc. The electronic functions include electronic mail, links between underwriting and other operations, suspense follow-up, premium reporting and direct billing.

The eighth function provided by this system relates to the changing of rate filings and rules. In order to insure the continued profitability and efficiency of insurance underwriting, the system responds quickly to rate and rule changes.

Turning now to the drawings, the system shown by the block diagram in FIG. 1 is comprised of a central processor 23 that is coupled by way of conventional communication channels, such as telephone lines or the like to various distributed terminals and/or displays.

In the embodiment depicted in FIG. 1, a central processor is coupled by suitable communication channels to various agent's offices that may be remote from the host computer, these offices being indicated generally at 20, 21. Each office may be physically spaced from the site of the central processor 23 or, alternatively, one or more of the remote offices may be located in the same physical structure or building therewith. Although only one remote office is illustrated as being connected to the processor 23, it will be appreciated by one skilled in the art that several additional remote offices may be connected thereto. Each remote office includes one or more terminals, each terminal being provided with an input means by which data may be manually entered b an operator to central processor 23 for storage in the computer data banks. Preferably, the input means comprises a keyboard of conventional construction which is operable by a user to enter client and insurance data into the central processor data bank. The keyboard may advantageously be combined with a video display device such as a video display terminal (VDT) to supplement communication between the central processor data bank and the remote terminal 20.

The central processor 23 is also coupled to various other remote terminals for use by other insurance company departments such as operations 25 or underwriting 27. These terminals are also equipped with keyboards to allow communications with the central processor 23 and to permit referrals between terminals e. g., a particular request 24 once acted upon by the operations department 25 may be referred, at 26 t underwriting department 27 for approval directly through the data base. Statistical and quality control information may also be extracted from the data base within the central processor by those having authorized access to the necessary data base (not shown).

The central processor 23 is provided with storage capacity to obtain and review the laws and regulations of various state agencies having governmental control over insurance transactions. Such laws and regulations, as mentioned above, control policy minimums, limits, etc., and, of course, are of particular interest to agents and underwriters in the various states. Further, as these laws and regulations change, users of this system are promptly apprised of such changes.

Once entry of data is complete 28, that client data is communicated to a batch paper request file 29 where it is stored to await batch transmission to the print set-up 30. At this point the predetermined insurance paragraph text is retrieved from the data base and, at 32, this text is merged with the client data. The completed paragraphs are then assigned predetermined sequential positions as they are to appear in the final document. This can be accomplished by the Xerox XICS printer control system 34 or any other appropriate control system. Printer 36 then prints a fiaal copy of the documents 38 for submission to the client.

Another advantageous feature of the present invention, as discussed in greater detail below, is that the various insurance transactions, and the operations and underwriting functions used to carry out those transactions, are "menu-driven". That is, the central processor is programmed to display on the VDT, a "menu" of all insurance functions that may be carried out by the user. This central processor is programmed to provide, upon the selection by the user of a particular one of those insurance functions, further dssplay of a "sub-menu" of those selectable functions or transactions which fall within the scope of the transaction selected from the initial, or "main menu". The "display screen" of the main menu for the agent, operations and underwriting functions are illustrated in FIGS. 7–9 respectively.

In FIG. 7, for example, an agent may choose from seven (7) selected functions 338 which can be performed by the processor. The selection of any of these functions results in the display of "sub-menu" functions, operations and sub-transactions by which the selection from the main menu may be carried out. FIGS. 10A–10H and 11A–11F represent particular screens which are individually displayed when the "client" function is selected from the home menu. The generation of these data screens and the entry of information required thereon are discussed in greater detail below.

With the above general discussion in mind, attention will now be directed to FIGS. 2A–2F, herein referred to as composite FIG. 2, which is a schematic flow chart of the overall scope of the processing system of the inttant invention for effecting the above described functions. The function blocks 55, 57, 76, and 104 of FIG. 2 are expanded in more detailed flow charts appearing in FIGS. 2C–2F, respectively.

Beginning at the top of FIG. 2, a user signs on at 40, by entering his name and/or his authorization code number at a terminal which communicates with the central processor. This entered information is checked at 42 to determine whether or not the user is authorized to enter the system. If the user is not authorized to enter, the system rejects his entry, at 44. If authorization is verified, the central processor determines, at 46, which level of authority to which the user is entitled. In this embodiment of the present system, three (3) levels of authority are selectively available to a user: the operations level 48, the underwriter level 50, and the agent level 52. The agent level 52 also is accessible by systems troubleshooters and engineers. If the operations level 48 is accessed, an operations decision step 54 is executed to determine precisely what function is to be carried out. These functions are discussed in greater detail below and are indicated generally at 55. If the user accesses underwriter level 50, there is provided an underwriting decision step 56 to determine the underwriting function to be provided. This underwriting function is also detailed below and indicated generally at 57.

Most user access, however, will be limited to the agent level 52 in order to write a policy or to provide a premium quotation. The first step in this level is to input client data, shown generally at 58. This encompasses entering basic client information in order to allow the system to cede from its data bank any previously entered information it might have regarding that client and, thus, only requires the user to supplement that previously entered information should it be applicable. Once this basic information has been entered, decision step 60 requires the user to indicate whether or not the information submitted refers to a new client or a preexisting client. If a new client is to be created, the system creates a new file for that client, shown at 62. If, however, the dtta refers to an existing client, the system is conditioned to add another policy or update an existing policy as shown at 64.

Once the proper client information 62 or 64 is entered and stored, the user provides, at 66, data concerning the business to be transacted for that client. This data is edited and stored in the appropriate master file by coverage shown at 68. The data is then evaluated and cross-checked for errors or incomplete information, as shown at 70. If the system detects the presence of incomplete information or errors, a correction step is instituted at 72. If this correction step 72 is successful in rectifying the errors, the system returns, at 73, to the policy information input step 66. If the correction step 72 is unsuccessful, a notice of the error is sent to the operations level 74 for correction at a later date. These files with items to be corrected listed are transmitted to the operations level indicated generally at 76 and discussed in greater detail below. This error analysis continues until the client and policy information is free of errors at which time a premium is calculated at 78.

Once the premium has been calculated 78, the premium breakdown by coverage is displayed, at 80 (FIG. 2B) to the client and/or agent by means of the display terminal. (This communication to the client could also be provided by forwarding a hard copy of the premium quotation to the client or by notifying him by any other acceptable means.) At this point a decision step is generated wherein the client indicates his acceptance or decline of the policy quote 82. If the client chooses not to accept the quote, he has the option of modifying specific variables with which he is not satisfied and the system retunns, at 88, to step 66 and the modification or change to the polccy is input into the system. If, on the other hand, the cleent chooses not to modify the policy or to request a further quote, the system stores the client and quote information in a "dead risk" file 86 for later statistical use.

Once the system has generated a policy which is accepted at 82, the system proceeds to the issue step 90 wherein the contract components are customized, at 92, according to the individual risk and/or client information; and the overall policy is reviewed for underwriting, at 94. Test 96 evaluates the customized contract for the presence of predetermined characteristics which indicate the need for further approval. If any of these predetermined criteria are present, the policy data is sent to the underwriter for modification, approval and/or refusal, as at 98. This evaluation by the underwriter is indicated generally at 100 and is discussed in greater detail below. Should the policy not need further approval, it is sent to a batch system 102 for printing and for determining, at 106, what further documents are necessary to prepare or obtain in conjunction with the contract. Examples of such documents are premium reports, MVR reports, appraisals, quality control and/or bills or countersigning. This process is indicated generally at 104 and discussed in greater detail below. Once the system has proceeded past this point, underwriter approval is granted at 108.

Figure 2B:
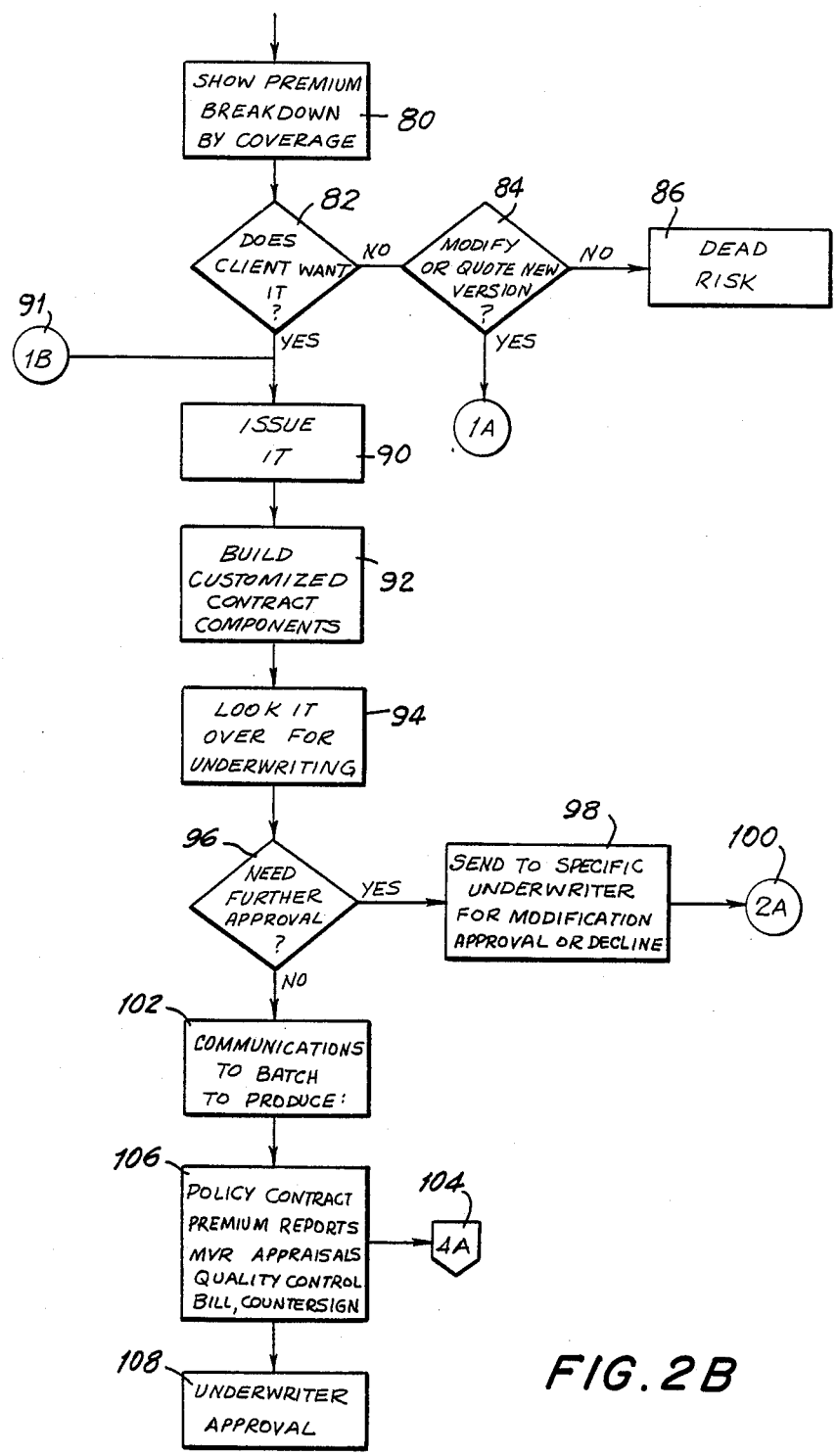
Figure 2C:
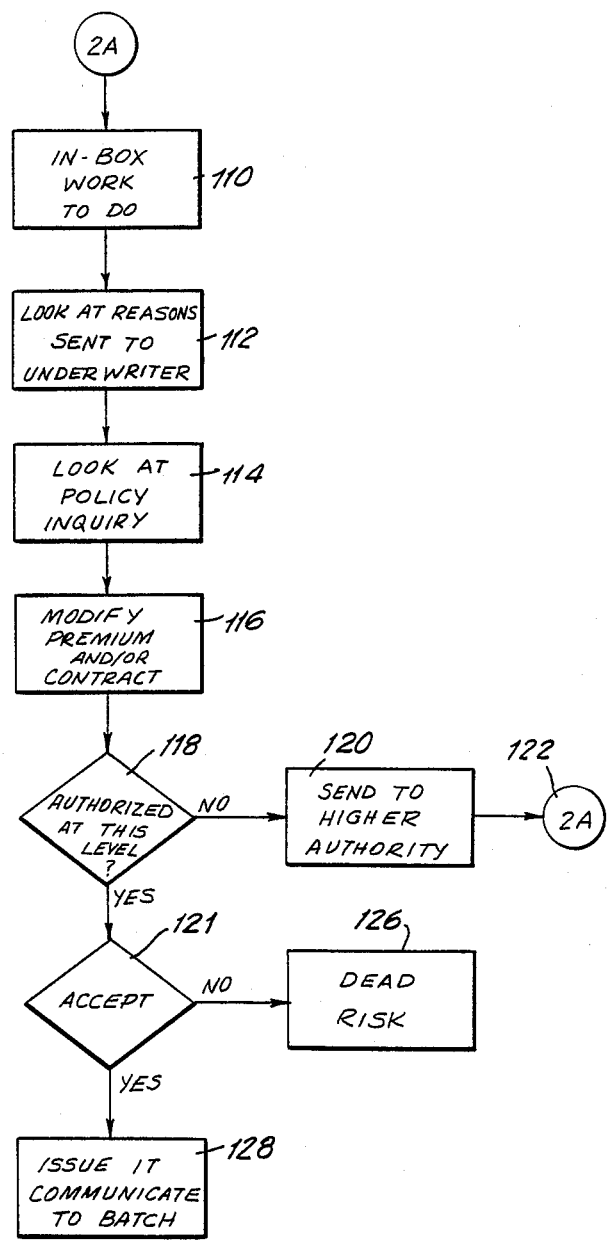

FIG. 2C shows a detailed schematic flow chart of the underwriting function referred to at 57 in FIG. 2A. Entry to this portion of the system is similar to entry into the agett's level in that a user signs on and the menu for underwriting 50, which contains a list of the underwriting functions available, is displayed. Once this display is complete, an "in-box" containing work to be performed is displayed, at 110. The underwriter evaluates, at 112, the work to be done and scrutinizes the displayed reasons for which the item of work was submitted to the underwriter. These reasons and the policy inquiry 116 are evaluated and the underwriter determines at 118 if the policy can be authorized at this level. If the policy cannot be authorized at this level it is sent to a higher underwriting authority 120 wherein a similar series of steps 122 are performed. If, however, the underwriter at the first level of authority can make a decision, at 120, he will do so. If he chooses to decline the policy, the information therein is delegated to the "dead risk" file, at 126, where it is stored for later statistical analysis. If he chooses to accept the policy, it will be issued and communicated to a batch system 128.

Figure 2D:
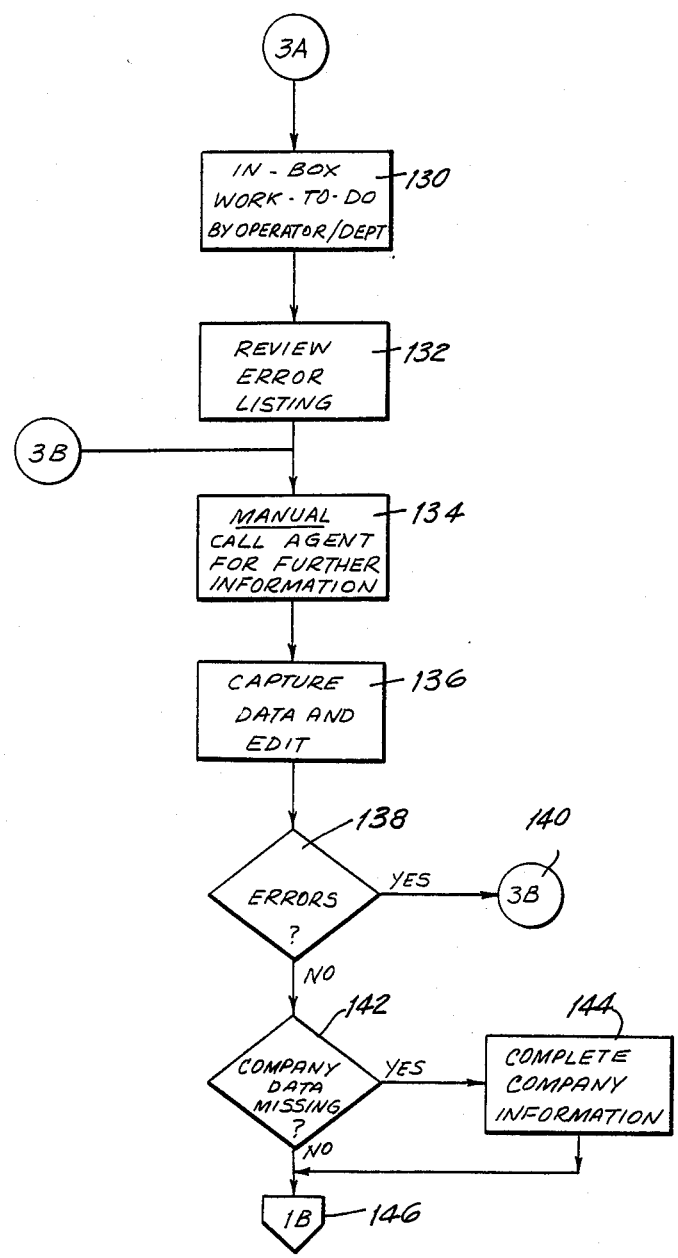

FIG. 2D is a detailed flow diagram of the functions performed by the operations level indicated generally at 55 of FIG. 2A and discussed above. Entry into the operations level is accomplished in the same manner as that of the underwriting level. Upon entry into the operations level the menu for operations is generated at 48 and the operation functions are chosen at 54. The user then reviews the work to do, which is displayed in an "in-box" 130, and he reviews the specific error listing, at 132. Where possible, the operator contacts the agent for clarification of the information submitted or for missing information necessary to process the request, as indicated at 134. If this information is available from the agent the operator edits that information and enters it into the central processor data bank, at 136.

Once this information is entered and edited, an error analysis 138 is performed. If errors are detected the agent must again be called at 140 and the operator again tries to secure and/or correct the data. If no errors are present, the policy is reviewed at 142 to determine whether any data relating to the insurance company is missing. If any of that information is missing, it is ceded from the main data bank, at 144. If not, the policy is reinserted in the system at 91 (FIG. 2B) for further processing.

Figure 2E:
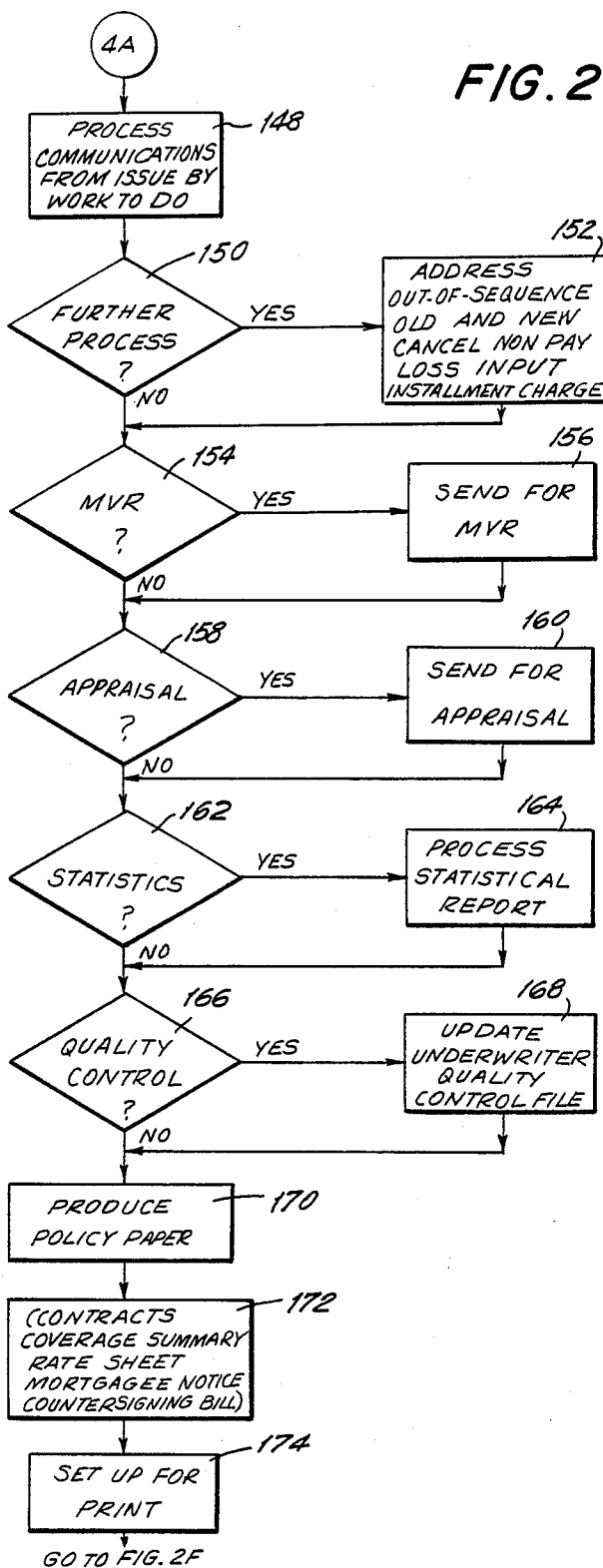

FIGS. 2E-2F show a detailed flow chart of the communication to batch function disclosed generally at 104 of FIG. 2B. Once the policy has reached this point in processing, it has been approved by the client and further approved by the underwriter and is prepared for printing and mailing to the client. In step 148 the policy is taken from the issue step 106 and run through a series of processing inquiries 150–168. The first of these inquiries determines if further processing is necessary based upon certain predetermined characteristics which would require that the policy be processed out-of-sequence. Such characteristics include the presence of a cancellation notice, a nonpayment of premium notice, or failure to pay an installment charge. It will be readily apparent to one of ordinary skill in this art that these criteria could be varied from system to system to suit the company's needs. If no further processing is necessary, the system determines, at 154, if an MVR is necessayy. If so, a report is ordered at 156 (for motor vehicle policies only). If no MVR report is required, the system determines at 158 whether or not an appraisal is necessary (for personal articles coverage or home policies). If so, the appraisal is ordered at 160. If no appraisal is necessary the system determines at 162 whether or not certain statistics required by state government are necessary. If these statistics are necessary a statistical report is processed at 164. If no statistical report is required, the system determines at 166 whether or not a quality control update is necessary. If such a report is required, an update is provided to the quality control file at 168. If not, the command is given to produce the contract policy 170. This command further generates the approval to produce documents necessary to the contract policy such as coverage summaries, rate sheets, mortgage notices, countersigning notices, state notices, and the like.

Once approval is provided, the above-described documents are set up for printing, at 174. After that, billing information is obtained, at 176, and any master file data on the policy is retrieved, at 178. This information is compiled by a separate compiler 180 to organize and control the print function to reduce the policy to paper. This function is provided by a Xerox XICS SYSTEM or any other appropriate system which has the capability of compiling, organizing and directing the printer to reduce the policy and bill to paper form. Once this compilation and printing is complete, the policy and bill are mailed to the client, as indicated at 182.

Figure 3:
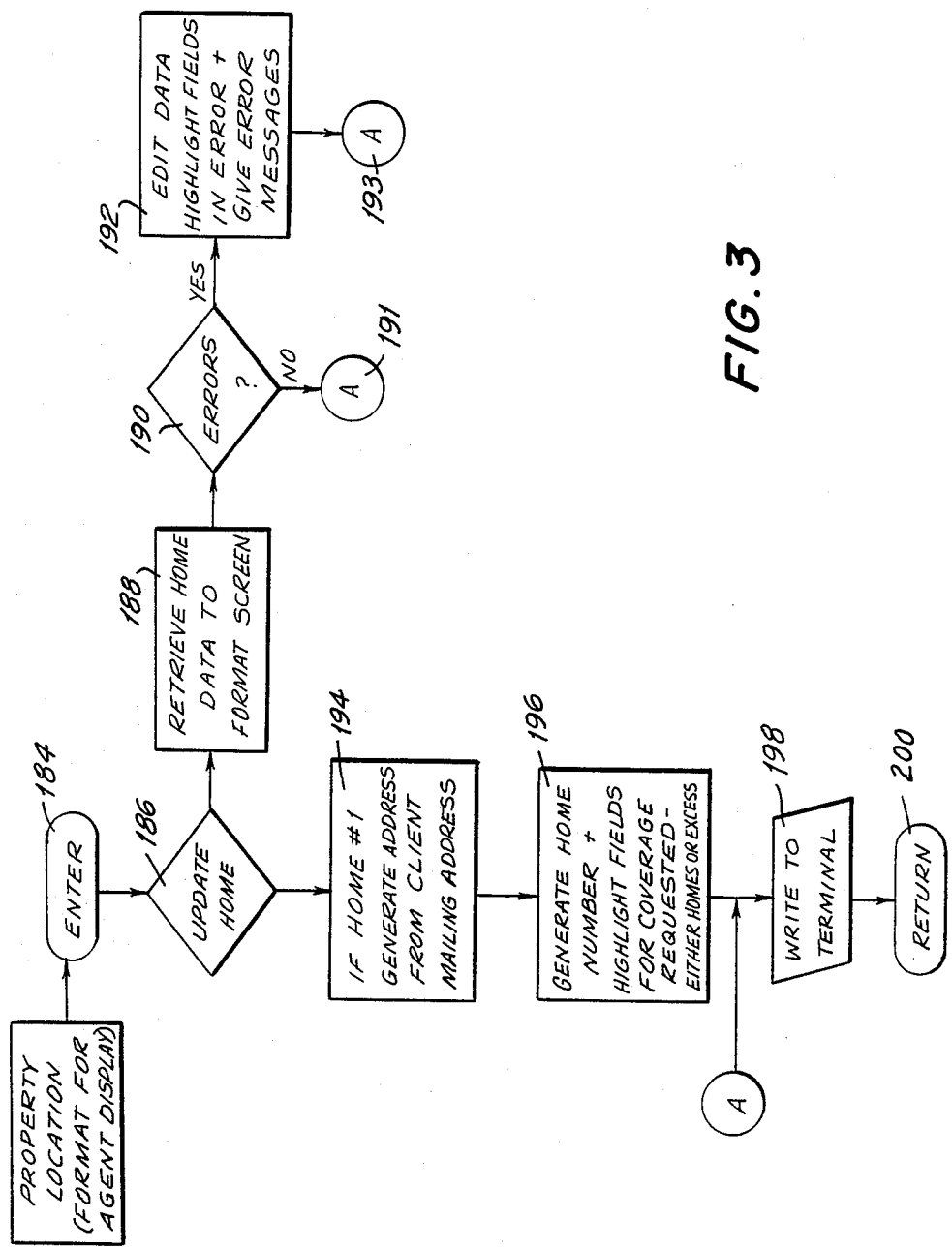
FIG. 3 is a flow chart indicating the format for agent display when creating a property policy.
Figure 4A:
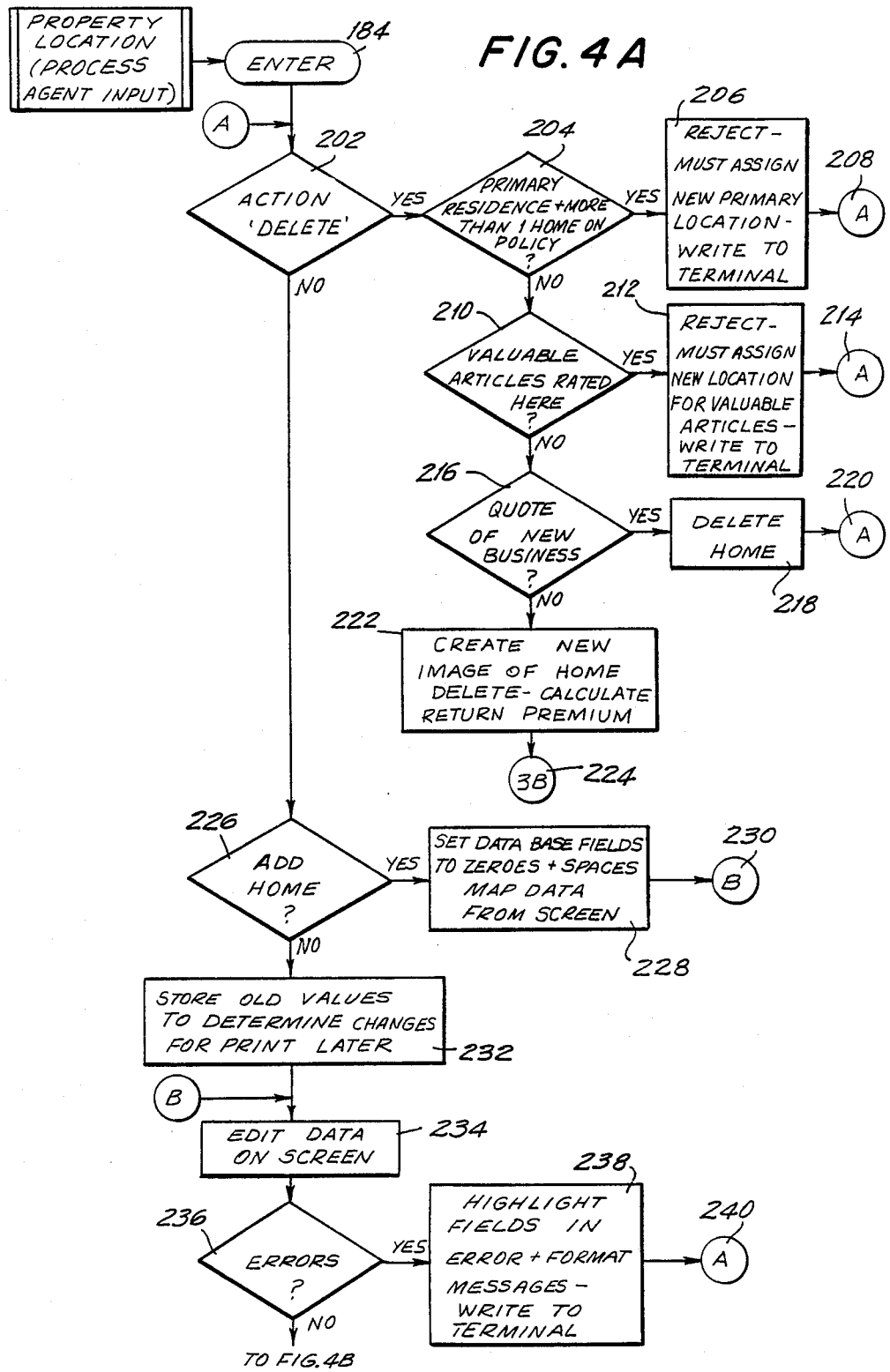
FIGS. 4A and 4B are respectively the upper and lower portions of a flow chart indicating the input process into the computer system for establishing a property policy.
Figure 4B:
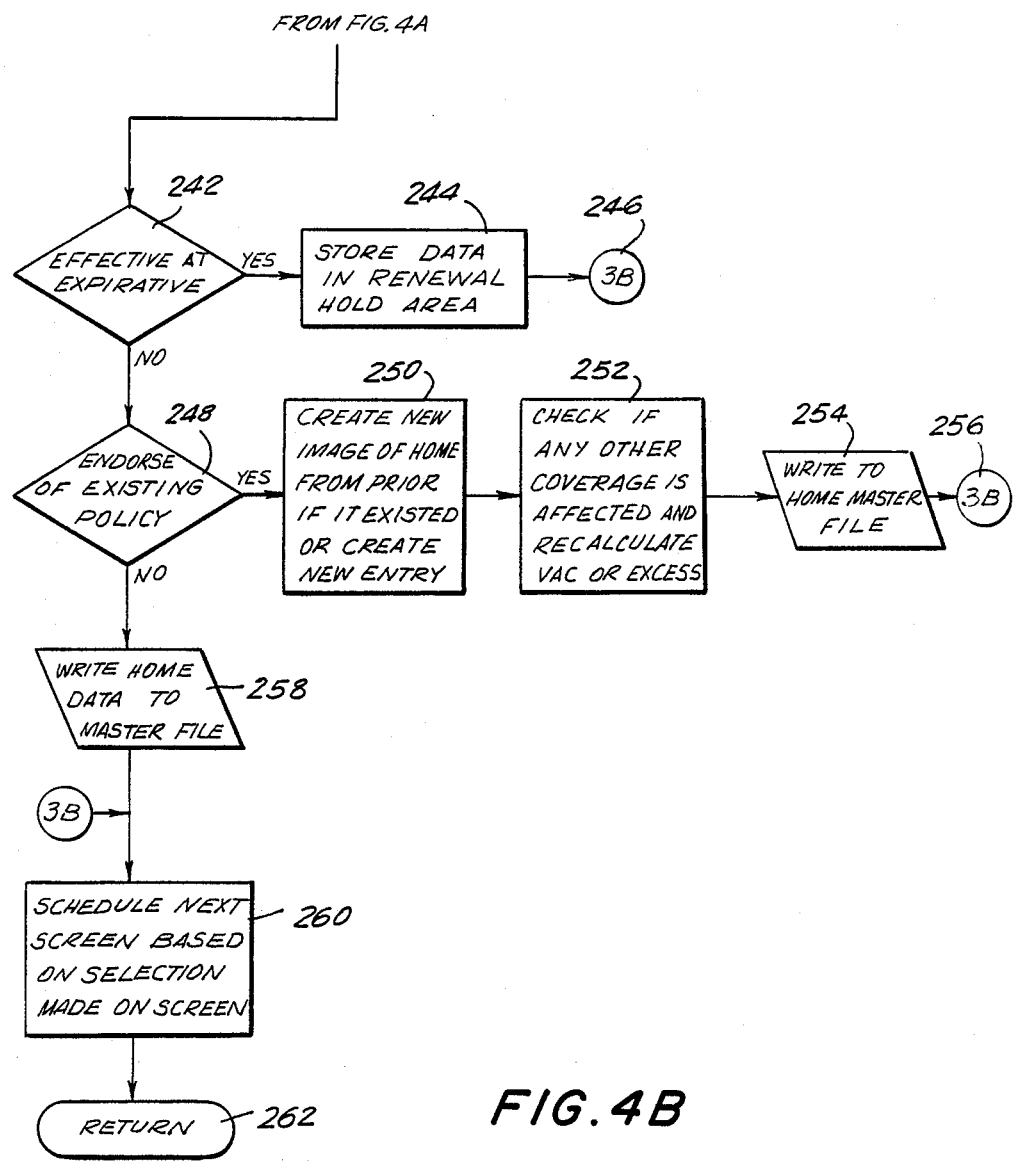

FIG. 3 and FIGS. 4A-4B are schematic flow charts showing the unique screen generating and retrieval function provided by one embodiment of the present invention. Specifically, these figures show a sample logic flow for updating a home insurance policy by an agent at a remote terminal. Entry into the system is accomplished as described above wherein the agent enters his name and authorization number. This number is analyzed according to the flow chart shown in FIG. 2. Once this analysis is complete, the data comprising the menu shown in FIG. 7 is generated by the central processor for display. The agent then chooses the appropriate function which he wishes to carry out, as indicated at 186. In the example shown in FIG. 3, the agent has chosen to update a home policy. When this function is selected, the central processor automatically retrieves from its data bank all information previously stored regarding the home policy. An error analysis is performed at 190 to detect the presence of any conflicting or non sequitur information. If no such errors are detected, the processor logic generates the next screen at the terminal, as shown at 198. However, if errors are located in the information ceded from the data bank, these errors are highlighted on the screen at the terminal for correction by the agent, if possible.

If the agent indicates that he is not updating a home policy, the system automatically retrieves from the client data base the client mailing address and assigns to that address the position of home number (1), as shown at 194. This information is then integrated into a policy screen which contains fields of information thereon highlighted to indicate, at 196, the minimal information which is necessary to complete the transaction. These screens are then transmitted to the terminal, and the processor logic returns to the entry step.

FIGS. 4A-4B show a detailed logic flow chart indicating some of the functions which ca be carried out on home policiss utilizing the screen generating feature of the present invention.

Once the agent has chosen from the menu, an action delete screen 202 is generated asking him to indicate whether or not he wishes to delete some portion or other data from the home coverage. If that response is affirmative and the agent wishes to delete the client's primary residence, as at 204, the system reviews the client dat base file to determine whether or not more than on home is on the policy. If more than one home is on the policy, the system rejects, at 206, the "delete primary residence" request. (This is necessary because in order to write a home policy and to determine the premium rate for valuable articles contained therein, including personal excess or other insurable risks, a primary location must be designated to establish a base for the premium rate tables.) As indicated at 208, the system generates information at the terminal instructing the agent to assign a new primary location. If the action requested is to delete the primary residence and there is only one home identified on the policy, the system searches the policy, at 210, to determine whether or not any valuable articles are rated on the basis of the primary residence sought to be deleted. If these valuable articles are present, the system again rejects the request, at 212, since a new primary location must be assigned in order to properly assess the premiums and the insured risk. If the "delete primary residence" request is entered and there are no valuable articles rated at that residence, the system generates a request to the agent, at 216, asking whether or not the client wishes a quote of new business, for example, a change in the policy parameters or deductible amounts. If the response to this request is affirmative, the information concerning that home on the policy is deleted and the system generates the next screen 260 (FIG. 4B) based upon this selection 220. If the response to the request for a quote of new business is negative, however the system deletes the primary residence that had been indicated, at 222, and calculates any premium balance which is to be returned to the client. At this point, the system generates the next screen based upon the selections made above, as indicated at 224.

If the agent does not select the "action delete" function, an add or update operation is executed. The system determines whether or not a further home is to be added to the policy by generating request 226. If the response to this reuuest is affirmative the system automatically sets the data base fields concerning the new home to (0) and presents an appropriate screen to the agent requesting entry of the necessary information. The fields necessary to write the policy on the new home are highlighted, at 228, and the system then proceeds to edit step 234.

If the client chooses not to add a home, the system stores the old (or existing) values for transmission to batch for print at a later date, 232. This entered information is edited at 234 and an error analysis 236 then is performed. If errors are located they are highlighted, as indicated at 238, and this information (with highlighting) is transmitted to the terminal for possible agent correction, as represented by 240. If no errors are located, inquiry is made at 242 if the changes requested should become effective at the expiration of the current policy. If such changes are to take effect at expiration of the current policy the system stores the entered data in a renewal hold file, and schedules the next screen for display based upon the previous selection made. If the user indicates that the changes are to become effective at other than the expiration date of the current policy, a request 248 is generated inquiring if the user wants to create an endorsement to an existing policy. An affirmative response causes the system to generate, at 250, a new image of the home data from prior data, if it exists, or if not, the system requests that data be entered at this time. The system also performs a check at 252 to determine whether or not any other coverage in the policy is affected by the requested changes (such as valuable articles coverage or excess liability coverage) and, if so, the system recalculates the premium based upon those changes. The information entered on this screen is transferred to the master data file 254 and the next screen is generated based upon the selections made above. If inquiry 248 is answered in the negative, the information on the screen is transferred into the master file, at 258, and a new policy is written. At this point the next screen to be displayed is scheduled based upon the selection made above, and the system returns to the enter step.

Figure 5:
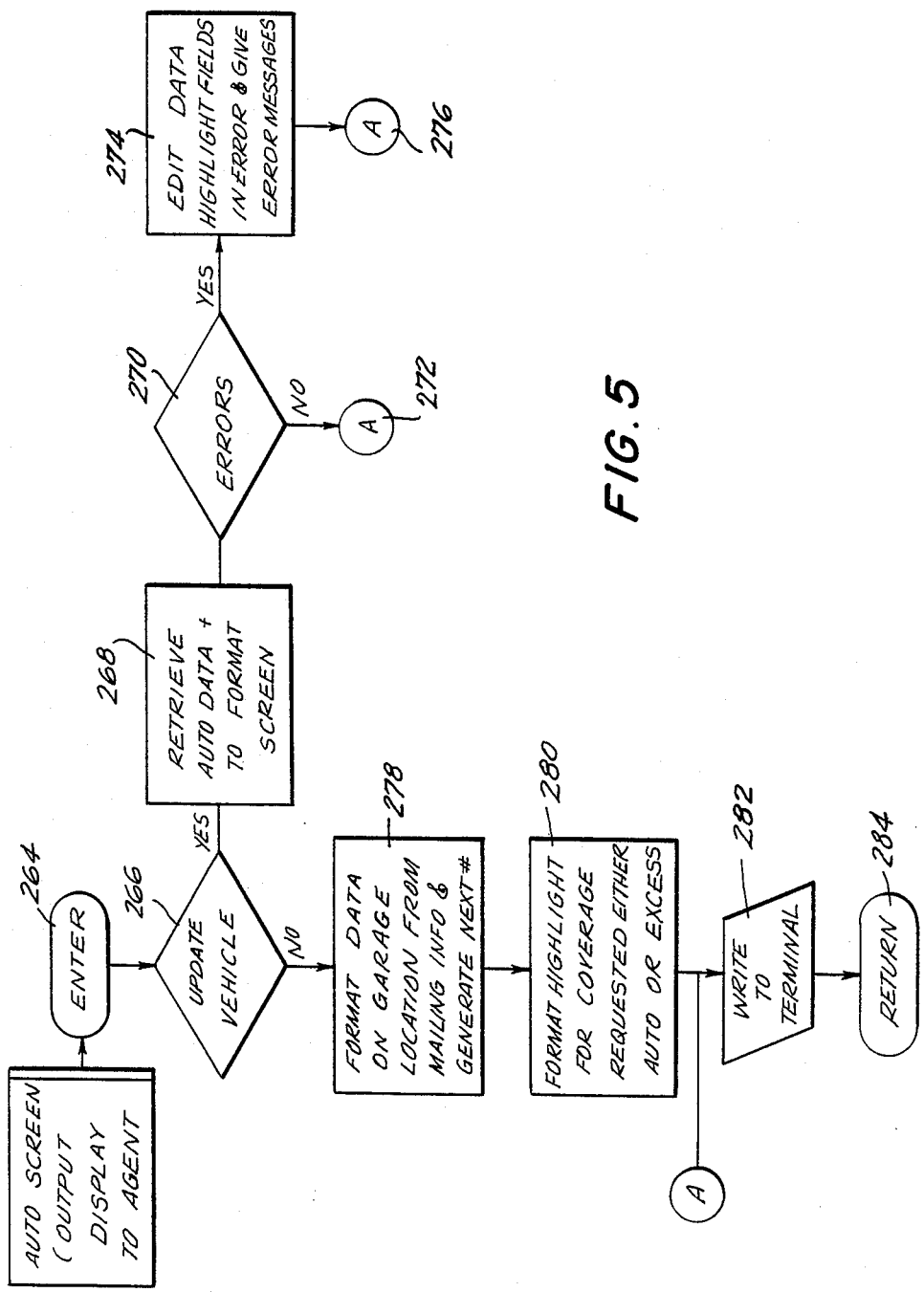
FIG. 5 is a flow chart depicting the output display to the agent when creating an automobile policy.

FIG. 5 is an example of a flow diagram representing the formatting of a data screen to show the adaptability and versatility of one embodiment of this computerized insurance system when it is utilized to provide automobile coverage. Entry 264 is achieved in the same manner as described above with regard to home coverage, and the action "update vehicle" screen 266 is transmitted to the user for decision. If the user wishes to update the insurance on an existing vehicle, the system automatically retrieves stored data on that automobile and transmits the first data screen at 268. An error analysis 270 first is performed by the system on that information. If errors are located, those fields containing the errors are highlighted at 274, and the system displays those errors at the terminal. Should no errors be located, the system continues the transaction. If the user chooses not to update the insurance on a vehicle, the system retrieves all information it has in its files concerning that particular vehicle or its owner. This information is drawn, for example, from home policy information or mailing information contained within the client data base. The system transmits screens containing client or risk information formated with highlighting to permit the user to indicate what changes or coverage he is requesting, as indicated at 280. This information is processed by the system and data representing a response is returned to the terminal, at 282. Upon completion, the system returns to the enter step.

Figure 6A:
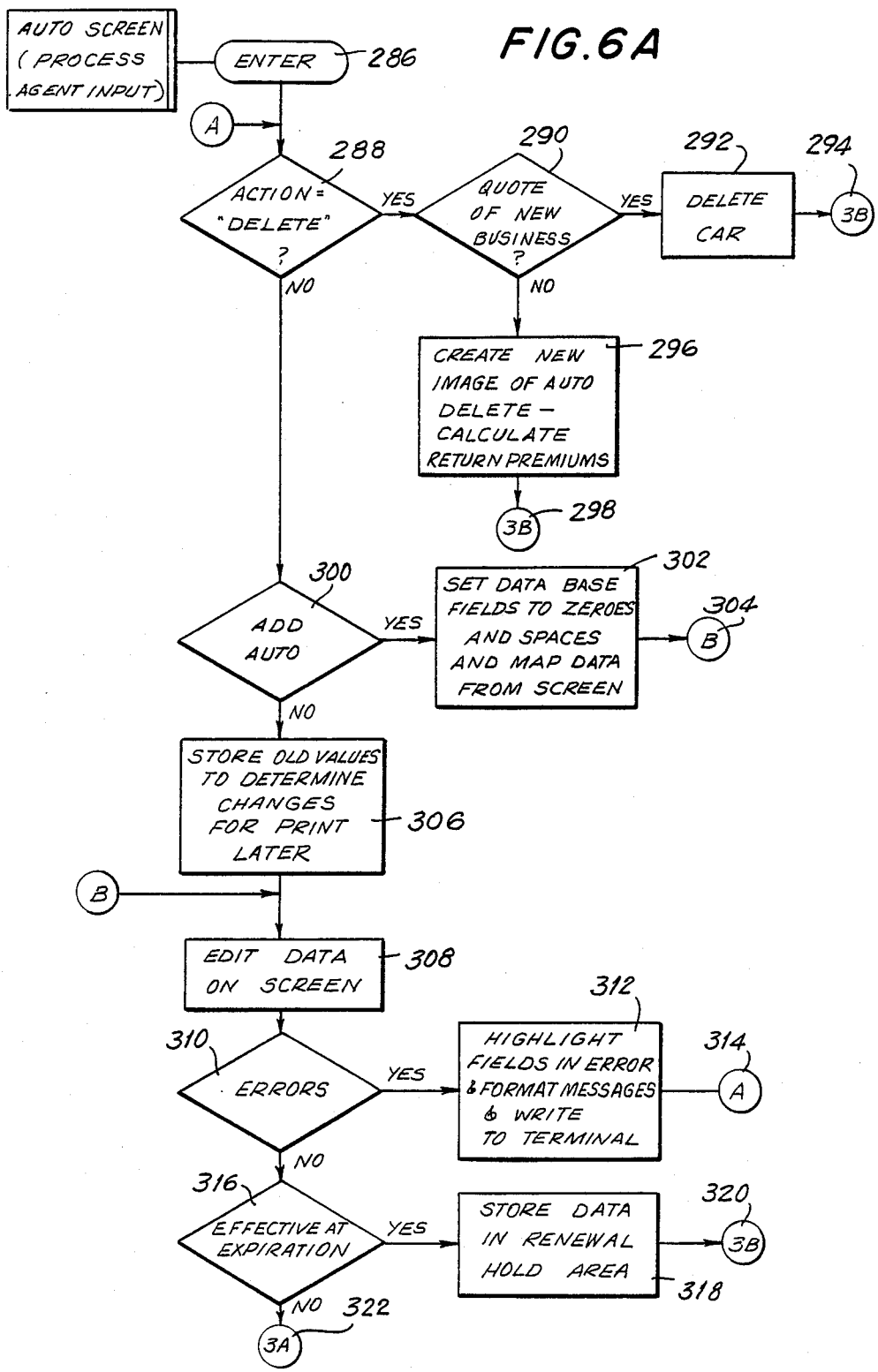
FIGS. 6A and 6B are respectively the upper and lower portions of a flow chart indicating the input process into the computer system for establishing an automobile policy.
Figure 6B:
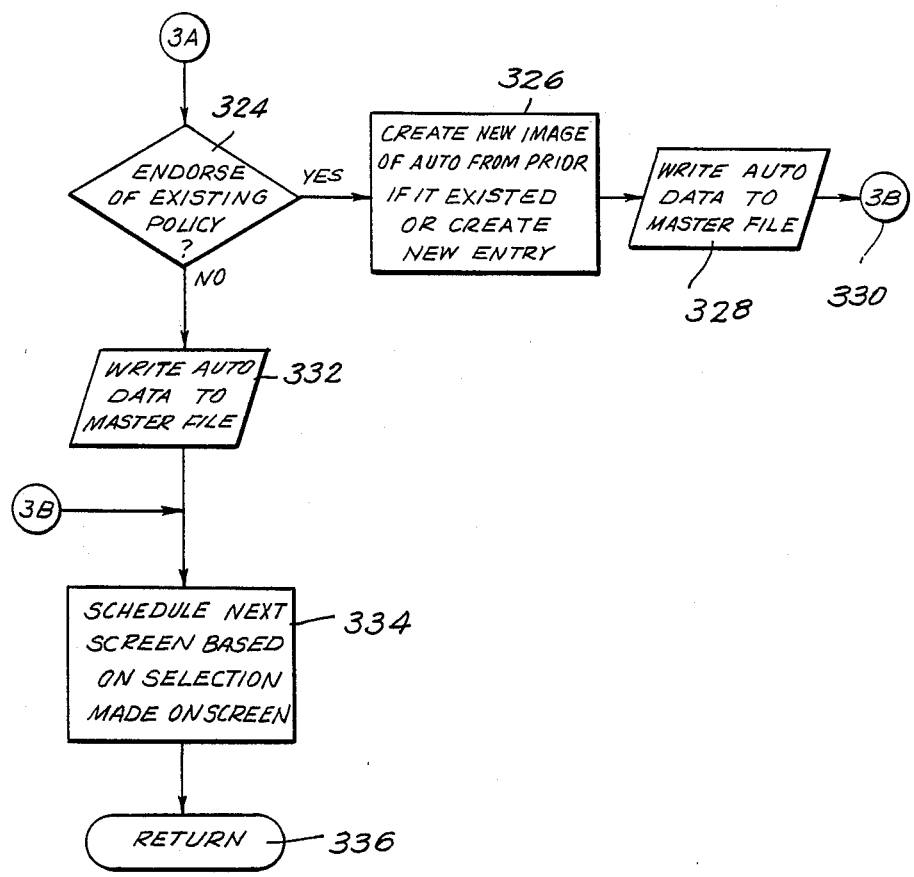

FIGS. 6A-6B are a schematic flow chart, collectively referred to here as FIG. 6, showing an example of the logic performed by the system when carrying out automobile policy related functions.

A user of the system enters the system in the same method as described above and, in response, the system generates an action request 288, for example, "delete?" wherein coverage or risks, for example, may be deleted. If the user responds in the affirmative, a new request is generated inquiring if a quotation of new business is requested. If this inquiry 290 is answered in the affirmative, the system at 292 automatically deletes the existing automobile from the insurance policy, and proceeds to step 294. If the response to inquiry 290 is negative, the system generates a screen containing all data on the automobile to be deleted and calculates, at 296, any return of premium required. The system then proceeds to step 298.

If the user indicates that he does not wish to conduct a "delete" function, the system inquires at 300 if an automobile is to be added to an existing policy. If the use wishes to add an automobile, the system sets the data base fields to (0) and generates at 302 the appropriate information screen to allow the user to enter the required information. If, alternatively, the user indicates that he does not wish to add an automobile to a policy but is merely changing the existing policy, the old values associated with that policy are maintained in the data base so that the requested changes can be made at a later date when the policy is printed. This way the system always has the proper data relating to the policy currently in effect.

These old values entered by the user are edited at 308 and an error analysis 310 is performed as described heretofore. Any errors detected in the entered information are highlighted at 312, and an error message is transmitted at 314 to the user at the terminal. If no errors are detected, the system inquires at 316 if the requested additions or deletions indicated are to be effective at the expiration of the current policy. If the user indicates that the changes are to be effective at expiration, the entered data is stored in a renewal hold file 318 for entry on expiration. If the user indicates that the changes are not to become effective at expiration, the system generates a request 324 asking the user if he wishes to endorse an existing policy. If the response to this request is affirmative, the system creates a new data image of the automobile from prior information entered into the data bank or, if there is no prior information, the system transmits a screen to facilitate entry of new information, if necessary. This information is transmitted to the master file 328. If an existing policy is not to be endorsed, the entered information is forwarded directly to the master file, and as indicated at 334, the next screen is scheduled for display, based upon the selections made above.

The similarities between FIG. 6 and FIG. 4 are readily apparent to one skilled in the art. The two functions described above in conjunction with the logic flow diagrams, i.e. the home update and the auto update functions, are described merely by way of examples to indicate the adaptability and efficiency of utilizing this invention in order to avoid the need for painstakingly entering redundant and often unnecessary information. Utilizing this streamlined system, premium quotes and policies are tailored to the individual client quickly and efficiently.

As mentioned previously, FIGS. 7-9 represent samples of "home" menus displayed by the system in response to entry request 40 shown in FIG. 2. These menus are utilized by the system to instruct the user as to those functions which are available to him. The individual formats of the displayed menus can be changed or tailored by individual insurance companies to make available to specific operators whatever functions the company deems necessary. A particularly advantageous screen system is the Telon Screen Print system shown in FIGS. 7-9.

FIG. 7 is an example of a Telon menu screen which would be transmitted to an agent terminal. This screen comprises a screen number for identification purposes shown at 335 and a title shown at 337, including company identification and title of the screen, in this case "home menu." Beneath the title are listed the individual functions A-G shown generally at 338 which are available for use by the agent. Also present on the screen are specific instructions 340 relating to the above functions. These instructions may be tailored to the individual user signing onto the system or alternatively may be tailored to indicate unique features of individual state law and individual state insurance requirements. At the bottom of the screen is an identification and action block shown generally at 342. This block is utilized by the agent to indicate such information as the action which the agent wishes to carry out, the letter of the function which he wishes to perform, the state in which the transaction is to occur, the client number, the quote number and/or the name of the client.

FIGS. 10A-10H and FIGS. 11A-11F, collectively referred to as FIG. 10 and FIG. 11 respectively, provide a detailed example of information screens which would be displayed at an agent's terminal when the "create client" function is selected from the home menu to create a new home and VAC policy (FIG. 10) and, at a later date, wherein the agent chooses to update that home and VAC policy to add an automobile (FIG. 11). These figures are provided to demonstrate the unique adaptability and versatility of this embodiment of the computerized insurance system. These screens will be described in detail with emphasis placed on those fields of information which will be highlighted to indicate that only information necessary to comply with the client's request must be entered.

FIG. 10A is a representation of the screen which appears when an agent selects the "create client" format from the home menu (item 3 of FIG. 7). Assuming that this is a new client and no information is present in the client data file regarding this client, the screen appears with no data entered and only those fields requesting the necessary information are highlighted.

Data will then be entered by the agent. The specific fields which will be highlighted are: the "name to appear on policy field" shown at 344, where the agent inserts whatever name the client wisees to appear on the policy; and "mailing address field" 346, which includes city 352, state 354, county 348, and zip code 350 fields, to be entered by the agent for mailing and storing in the client data file.

Fields representing minimal client information are also highlighted. These fields include the first and last name of the client, indicated respectively at 356 and 358, and also the occupation 360 and age 362 of the client. Utilizing this embodiment of the present system, these fields represent the minimal information necessary to initiate processing of this client's request.

Once this minimal information has been entered by the agent, the command is given by the agent to process the entered data. Thereafter, the next screen is displayed. This screen contains client information data entered on the prior screen and continues to solicit only that information necessary to carry out the client's request.

FIG. 10B is the next screen to appear in response to the information entered on the screen shown in FIG. 10A. This screen appears with all "Y/N" (or yes/no) fields set to "N" except the last field 386 which is set to "Y." The particular information fields which are highlighted on this screen are indicated at 364-386 and are displayed for confirmation or entry by the agent. The "date received" field 368 and "date requested" field 370 are automatically set to the current date and the "writing company" field 378 is automatically set to "Federal" since this is the most commonly used entry in insurance writing by the assignee of the present invention. These entries are not fixed, however, and can be changed by the agent. Under the "coverages requested" field, the agent indicates what type of insurance coverage his client wishes. (In this case, the "homes/contents" and "valuable articles" are indicated in the affirmative.) The effective date of the policy is also indicated at 374 and the expiration date is generated to be a predetermined amount of time after the effective date shown at 376. The "producer number" field 380 is highlighted to allow for agent identification and quality control. The "agency bill" field 382 is highlighted to indicate whether the agent will bill the client or, in the alternative, if the company should bill the client directly. The final two fields (the mailing instructions field 384 and the field indicating whether or not the policy is written in the name of an individual) are necessary items in compiling the final policy. The coverages requested at 372 are use to determine the sequence of screens that appear next and also affect the highlighting on later screen. More specifically, any information ettered at this stage which might appear on a later screen is picked up and inserted into the latter screen without requiring a second manual entry by the agent.

The next screen to appear in this sequence is the liability limit screen shown at FIG. 10C. The liability limits are requested on a separate screen because these limits apply to other coverages including home, automobile and boat insurance policies, if any. This screen is provided with an indication to apprise the client and/or agent of the number of quotes which have been provided utilizing this data. Since this is a new client, a notation, "quote version one," appears at 388. At this point the agent enters the limit of legal liability as directed by the client, in this case $300,000. Again, the agent selects the action sequence and the information entered is processed.

The next screen to be generated again is determined in response to the information entered previously. Because home coverage has been selected, FIG. 10D represents the next screen to be generated in this sequence. This screen is directed to specific physical characteristics of the property to be insured as well as its location and address. The screen is generated as shown with the street, city, county, state and zip code filled in by the system utilizing information ceded from the mailing address entered by the agent on screen FIG. 10A. All of the "Y/N" fields are set to "N" except the field indicated at 408 which is the home and/or contents coverage field.

In this embodiment, a separate data base file is contained within the system which contains universal characteristics of certain territories and city/county codes. Utilizing this file, information pertaining to the particular fire characteristic of homes in that general area is generated and will not require separate entry by the agent. Because home coverage has been selected by the agent in this case, fields 390-408 would be highlighted. These fields represent the minimal information necessary to provide a premium quotation for a home coverage policy. If, however, the agent had requested an excess liability policy, only the address would be highlighted. The other fields generated on the screen by the system could be highlighted depending upon the type of residence entered. The edit check performed after the information is entered reviews the information and compares it to certain predetermined parameters to determine whether or not further information, such as the year in which the home was uuilt, or the fire district, are necessary to determine the quotation. If further information is necessary, this screen is again generated at the display terminal and fields requesting that further information are highlighted.

Once property location information has been entered and stored, the system generates a home and/or contents coverage screen shown in FIG. 10E to obtain particular value parameters used to determine premium information. On this screen the highlighted segments include the value of the building and/or additions or alterations 410, the value of structural contents 412, the particular coverage requested by the client 414, the type of liability requested 416, the deductible requested 418 and whether or not the client has indicated that he wants an actual cash value credit for the contents 420 or earthquake coverage on the structures 422. Again all "Y/N" fields are set to "N," but these fields may be changed to "Y" by the agent in the event the client indicates that a particular coverage having an "N" entry is desired.

Where the client has indicated that, in addition to home coverage, he would like to include valuable articles coverage in his policy, the screen depicted in FIG. 10F is generated. The property location information is carried forward from the property location screen and need not be separately entered by the agent. The property location number 410 is highlighted, however, in order to confirm information pertaining to that property location. The agent inserts the amount of blanket coverage or itemized coverage requested for each valuable individual article to be insured. There is also provided at 412 an "in-vault amount" field wherein the agent enters the value of valuable articles which are retained in a secure vault at a remote location and for which the client wishes further coverage utilizing this property location as a primary location.

Once all of this data has been entered by the agent and edited and evaluated by the system, the premium quotation is calculated and presented to the agent and/or client in the policy premium summary screen shown at FIG. 10G. This premium summary is itemized and is presented adjacent to the risk shown at 424. If the client approves the policy and the premium, the selection mode "issue" is entered by the agent and, assuming that the policy did not contain any predetermined criteria requiring non-concurrent underwriting, the screen shown in FIG. 10H is generated indicating that the policy has been issued as requested. Had the information entered contained predetermined parameters indicating that the risk was non-concurrent, the message "your policy has been sent to underwriting for review" would appear.

At this point the information is processed through the system as previously shown and described in FIGS. 2E-2F.

FIGS. 11A-11F indicate the screen sequence that is generated if the client from FIG. 10 requests an endorsement of his existing policy to add an automobile after the home policy had been issued. In order to carry out this function the agent selects the "update quote/policy" function on the home menu and the screen shown in FIG. 11A is displayed at the terminal. All client and location information entered from the original policy is automatically ceded from the data bank and inserted into the appropriate data fields and this information is displayed to the user for verification. This information is indicated generally at 430-438. The request fields indicated generally at 440 are all set to "N" and are highlighted. In the present case where an endorsement is requested, the agent changes this "N" entry to a "Y." The effective date field shown at 442 has the crrrent date entered therein. If that is not the date desired by the client, the agent inserts the appropriate requested date. The information entered via this screen is processed by the system and, based upon the information entered, the next screen is generated.

By choosing the endorsement selection from FIG. 11A the next screen to be generated is the "quote/policy selection" screen shown in FIG. 11B, setting out those possible endorsements which the agent can select. These selections are indicated generally at 444. The agent makes his selection by choosing the appropriate letter adjacent his selection and entering its letter in the letter field at 446. All other information on that screen is generated from prior information ceded from the file of the previous policy. The effective date indicated at 448 is carried over from screen FIG. 11A and is necessary to create the policy endorsement.

In this example, a driver and an automobile are to be added as an endorsement to the home policy. The first screen to be generated by the system is entitled "household members", FIG. 11C, and it requests the entry of specific information regarding the driver. Again, as above, all "Y/N" fields are set to "N" and the agent may change any of these as appropriate. This sequence of screens assumes that the driver is the same as the client and that information is therefore inserted into the screen. This advantageous feature avoids the necessity of having the agent insert duplicative information and considerably reduces the time required to create the application, premium quote, and/or policy.

The entered driver information is confirmed by the agent and is stored. The system then generates the screen requesting information regarding the vehicle. This screen is shown in FIG. 11D. On that screen, data fields indicated at 450–482 are highlighted either for entry or for confirmation by the agent. If, in the alternative, the client requests an excess-only policy, only data fields directed to vehicle year, make, model and type code are highlighted. A unique feature of this system is that some of the information requested in the data fields is generated from information previously entered either in the client or policy data bases. (One example of this utility is that the average retail cost of the vehicle can be determined from stored look-up tables and inserted if, at any point, the VIN/serial number of the vehicle to be insured has been entered into the data base. If that information is not available, however, it can be input at the time of the request for quotation. As dsscribed above, all "Y/N" fields are set to "N" and the agent selects the appropriate responses. The data fields requesting the garage location 472, county, state, zip code, territory and city/county codes, are automatically ceded from the primary residence location indicated in the existing policy. This information can be altered where necessary by the agent. Once this information has been entered, an edit and error analysis step is conducted and additional fields may be highlighted for the entry of additional information depending upon the data that already has been entered. Should more information be required, particular information fields are highlighted and an error message is returned to the screen. A sample of this type of message is shown in FIG. 11E. In this case, the vehicle entered is to be registered in a state which has imposed state-mandated coverages such as uninsured motorist or no-fault coverage. This screen is designed as a flag to indicate to the agent that additional coverage must be written in order to satisfy state requirements.

Once these error messages have been addressed, the system again generates a policy premium summary screen as shown in FIG. 11F. This premium summary differs somewhat from that described in FIG. 10G in that the endorsement premium summary of FIG. 11F shows only those coverages affected by the endorsement. If the premium is acceptable to the client, the selection "issue" is entered and the data that had been entered previously is transmitted for compilation and printing.

While this invention has been particularly shown and described with reference to a preferred embodiment, it will be readily appreciated by those of ordinary skill in the art that various changes and modifications may be made without departing from the spirit and scope of the invention. For example, the particular formats of the various display screens described herein may be modified, as desired. Likewise, the present invention should not be limited to the specific examples described herein since a greater or lesser number of options and functions for each of the menus and sub-menus that may displayed on a VDT are within the scope of this invention. It is, therefore, contemplated that the appended claims be interpreted as including the foregoing and other changes and modifications.

What is claimed is:

1. A computerized insurance system for preparing and processing applications for insurance and premium quotations, and for preparing and writing insurance contracts requested by clients, said system comprising:
   processing means, including an interactive data bank into which data is written and from which data is read, said data bank storing information regarding a risk to be insured, client information, insurance premium information and the full text of all contract provisions
   terminal means for interactively communicating on-line with said processing means and accessibly by an operator to produce requestes and to enter information and/or retrieve information for writing into and/or reading from said data bank;
   display means for displaying information that is entered and retrieved;
   merging means included in said processing means for reading out from said data bank selected client information and only the text data of those contract provisions which apply to the particular contract and merging said read out client information and said read out particularized text data to compile final insurance contract documents tailored to each client; and
   print means coupled to said merging means for printing said final insurance contracts.

2. A computerized insurance system as in claim 1 which further comprises underwriter review means for electronic video display to the underwriter of risk and client information that has been written into said data bank and including manually operable means for approving, modifying and/or disproving requested insurance contacts.

3. A computerized insurance system as in claim 1 further comprising error analysis means for comparing information entered by an operator with information stored in said data bank to detect the presence of errors in the entered information and/or the need to enter additional information.

4. A computerized insurance system as in claim 3 further comprising means for controlling said display means to display detected errors add/or detected need for additional information.

5. A computerized insurance system as in claim 1 which further comprises means for enabling access to said data bank in response to predetermined information entered at said terminal means by said operator.

6. A computerized insurance system as in claim 1 wherein the risk insured relates to an automobile.

7. A computerized insurance system as in claim 1 wherein the risk insured relates to a dwelling.

8. A computerized insurance system as in claim 1 wherein the risk insured relates to personal liability coverage.

9. A computerized insurance system as in claim 1 wherein the risk insured relates to excess liability coverage.

10. A computerized insurance system as in claim 1 wherein the risk insured relates to watercraft.

11. A computerized insurance system for preparing and processing applications for insurance and premium quotations, and for preparing and writing insurance contracts requested by clients, said system comprising:

processing means, including an interactive data bank into which data is written and from which data is read, said data bank storing information regarding a risk to be insured, client information, insurance premium information and the full text of contract provisions terminal means for interactively communicating on-line with said processing means and accessible by an operator to enter information and/or retrieve information for writing into or reading from said interactive data bank, said terminal means being further operable to produce a premium quote request;

display means for displaying information and data written into and/or read from said data bank;

means for calculating insurance premiums in said processing means in response to a premium quote request produced at said terminal means by said operator;

means for displaying said calculated premium quotes at said display means for client approval and/or disapproval; and document formation means for combining, upon receipt of client approval, data from said data bank to generate insurance contract documents tailored to said client.

12. A computerized insurance system as in claim 11 wherein said document formation means comprises:

merging means for combining client information with predetermined text data to produce a portion of the insurance contract documents; and sequencing means for positioning said portions into predetermined format.

13. A computerized insurance system for preparing and processing applications for insurance and premium quotations, and for preparing and writing insurance contracts requested by clients, said system comprising:

processing means, including an interactive data bank into which data is written and from which data is read, said data bank storing information regarding a risk to be insured, client information, insurance premium information and predetermined text data for incorporation into insurance contracts;

terminal means for interactively communicating on-line with said processing means and accessible by an operator to produce requests and to enter information and/or retrieve information for writing into and /or reading from said interactive data bank;

display means for displaying information and data written into and/or read from said data bank;

screen prompting means for transmitting data representing a common application form to said disllay means for display thereat and for use by said operator in formulating a policy application and/or a premium quote;

means for calculating insuracne premiums in said processing means in response to a request by said operator, said calcllating means incorporating client and risk information in said data bank to generate a premium quote;

document formation means for combining data from said data bank to generate insurance contract documents tailored to said client; and print means communicating with said document formation means for printing said insurance contract.

14. a computerized insurance system as in claim 8 which further comprises means for providing electronic video display of the insurance contract documents for final approval, modification and/or disapproval by an underwriter.

15. A computerized insurance system as in claim 14 which further comprises keyboard means for communicating with said processing means, said keyboard means being operable by said underwriter to approve, modify or disapprove said insurance contract documents.

16. A computerized insurance system as in claim 13 wherein said screen prompting means further comprises highlighting means for transmitting to said display means highlight data for indicating predetermined items of information on the displayed common application form which must be provided in order to comply with a respective request entered by said operator.

17. A method of operating a computerized insurance system for preparing and processing insurance application and premium quotations, and for preparing an writing insurance contracts requested by clients, said method comprising the steps of:

storing in an interactive data bank, into which data is written and from which data is read, client information, risk information, insurance premium information and predetermined text data for incorporation into insurance contracts; the data bank storing and the system processing insurance related to different coverages, operating a terminal, which interactively communicates on-line with said data bank, to enter and retrieve information and data for writing into and reading from said data bank;

displaying information and data written into and/or read from said data bank;

transmitting to said terminal application data for display thereat in response to information entered at said terminal;

combining information entered at said terminal with data stored in said data bank to generate premium quote information;

displaying said premium quote information at said terminal for client approval and/or disapproval;

correlating client data in said data bank, data entered at said terminal, and predetermined text data to create insurance contract documents tailored to individual clients; and printing said tailored contract documents.

18. A method as in claim 17, further comprising the steps of:

electronically displaying said insurance contract documents to an underwriter for aprroval, modification and/or disapproval;

transmitting data representing approval, modification and/or disapproval to said data bank to store approval, modification and/or disapproval of said documents; and electronically indicating the approval, modification and/or disapproval of said documents.

19. A method as in claim 17 wherein the step of transmitting application data to said terminal further includes the steps of:

analyzing the information entered at said terminal into said data bank against data stored in said data bank for the presence of errors in the entered information and/or for the need to enter additional information; and highlighting said displayed application data to indicate the presence of errors and/or the need to enter additional information.

20. A method as in claim 17 wherein the application data transmitted to said terminal includes selected application information which, when displayed, constitutes an application form, and includes selected premium quote information which, when displayed, constitutes a premium quote form.

21. A computerized insurance system for preparing and processing applications for insurance and premium quotations, and for preparing and writing insurance contracts requested by clients, said system comprising:
processing means, including an interactive data bank into which data is written and from which data is read, said data bank storing information regarding a risk to be insured, client information, insurance premium information and the full text of all contract provisions
terminal means for interactively communicating on-line with said processing means and accessible by an operator to produce requests and to enter information and/or retrieve information for writing into and/or reading from said data bank;
display means for displaying information that is entered and retrieved;
merging means included in said processing means for reading out from said data bank selected client information and only the text data of those contract provisions which apply to a particular contract and merging said read out client information and said read out particularized text data to compile final insurance contract documents tailored to each client;
means for integrating endorsement information into the contracts; and
print means coupled to said merging means for printing said final insurance contracts integrating said selected client information and predetermined text data, said read out client information and said read out out text data and said endorsement information.

22. A computerized insurance system as in claim 21 which further copprises underwriter review means for displaying risk and client information that has been written into said data bank and including manually operable means for approving, modifying and/or disproving requested insurance contracts.

23. A computerized insurance system for preparing and processing applications for insurance and premium quotations, and for preparing and writing insurance contracts requested by clients, said system comprising:
processing means, including an interactive data bank into which data is written add from which data is read, said data bank storing information regarding a risk to be insured, client information, insurance premium information and the full text of all contract provisions
terminal means for interactively communicating on-line with said processing means and accessible by an operator to produce requests and to enter information and/or retrieve information for writing into and/or reading from said interactive data bank;
display means for displaying information that is entered an retrieved;
means for automatically detectin;g certain predetermined criteria relating to the insured risk to trigger underwriter review only if those criteria are met
merging means included in said processing means for reading out from said data bank selected client information and only the text data of the those contract provisions which apply to a paraticular contract and merging said read out client information and said read out particularized text data to compile final insurance contract documents tailored to each client; and
print means coupled to said merging means for printing said final insurance contracts:

24. A computerized insurance system for preparing and processing applications for insurance and premium quotations, and for preparing and writing insurance contracts requested by clients, said system comprising:
processing means, including an interactive data bank into which data is written and from which data is read, said data bank storing information regarding a risk to be insured, client information, insurance premium information and the full text of all contract provisions
terminal means for interactively communicating on-line with said processing means and accessible by an operator to enter information and/or retrieve information for writing into or reading from said interactive data bank, said terminal means being further operabl to produce a premium quote request;
display means for displaying information and data written into and/or read from said data bank;
means for automatically requesting certain predetermined reports from no-system sources depending upon the type of risk that is insured and/or the amount of insurance that is requested; and
means for displaying said predetermined reports at said display means.

25. A method for computerized preparation and processing of insurance applications and premium quotations, and for preparing and writing insurance contracts requested by clients, said method comprising the steps of:
storing in an interactive data bank, into which data is written and from which data is read client information, risk information, insurance premium information and the full text of all contract provisions;
operating a terminal, which interactively communicates on-line with said data bank which is accessible by the terminal, to enter and retrieve information and data for writing into and reading from said data bank;
displaying information and data written into and/or read from said data bank;
transmitting to said terminal application data for display thereat in response to information entered at said terminal;
combining information entered at said terminal with data stored in said interactive data bank to generate premium quote information;
intergrating endorsemen information into the contracts;
displaying said premium quote information at said terminal for client approval and/or disapproval;
correlating client data in said interactive data bank, data entered at said terminal, text data of only those contract provisions which apply to a particular contract and endorsement information to create insurance contract documents tailored to individual clients; and
printing said tailored contract documents.

* * * * *